US010706809B2

(12) United States Patent
Shin et al.

(10) Patent No.: US 10,706,809 B2
(45) Date of Patent: Jul. 7, 2020

(54) EXTERNAL MODULE AND VEHICLE CONNECTED THERETO

(71) Applicant: LG ELECTRONICS INC., Seoul (KR)

(72) Inventors: Hyunseok Shin, Seoul (KR); Daegeun Ha, Seoul (KR); Junyoung Yu, Seoul (KR); Taekyung Lee, Seoul (KR); Byeongrim Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/090,062

(22) PCT Filed: Mar. 31, 2016

(86) PCT No.: PCT/KR2016/003332
§ 371 (c)(1),
(2) Date: Sep. 28, 2018

(87) PCT Pub. No.: WO2017/171124
PCT Pub. Date: Oct. 5, 2017

(65) Prior Publication Data
US 2019/0139509 A1 May 9, 2019

(30) Foreign Application Priority Data
Mar. 29, 2016 (KR) .................. 10-2016-0037478

(51) Int. Cl.
*H04W 4/48* (2018.01)
*G06F 3/14* (2006.01)
(Continued)

(52) U.S. Cl.
CPC ............... *G09G 5/003* (2013.01); *B60Q 9/00* (2013.01); *B60R 1/00* (2013.01); *G06F 3/147* (2013.01);
(Continued)

(58) Field of Classification Search
CPC ........................... H04W 4/46; B60W 30/0953
See application file for complete search history.

(56) References Cited

U.S. PATENT DOCUMENTS 10,325,488 B2 * 6/2019 Suzuki ................... B60Q 1/525
2016/0203560 A1 * 7/2016 Parameshwaran ..... G06Q 40/08
705/4
(Continued)

FOREIGN PATENT DOCUMENTS

EP 3088268 A1 * 11/2016 ......... G06K 9/00798
KR 10-2015-0009815 A 1/2015
(Continued)

OTHER PUBLICATIONS

Office Action for KR 10-2016-0037478 dated Aug. 1, 2017.

*Primary Examiner* — Paulos M Natnael
(74) *Attorney, Agent, or Firm* — Birch, Stewart, Kolasch & Birch, LLP

(57) ABSTRACT

The present invention relates to an external module comprising: an interface physically connected to a vehicle so as to exchange data with the vehicle; and a processor for receiving peripheral information of the vehicle and state information of the vehicle through the interface, acquiring the ADAS information, on the basis of the peripheral information of the vehicle and the state information of the vehicle, and performing control so as to allow a display inside the vehicle to display the ADAS information by transmitting the ADAS information, through the interface, to the vehicle.

17 Claims, 16 Drawing Sheets

(51) Int. Cl.
*H04W 4/46* (2018.01)
*H04W 4/024* (2018.01)
*G06F 3/147* (2006.01)
*G06F 21/31* (2013.01)
*G08G 1/0968* (2006.01)
*H04L 29/06* (2006.01)
*H04W 4/12* (2009.01)
*B60Q 9/00* (2006.01)
*B60R 1/00* (2006.01)
*G09G 5/00* (2006.01)
*G06F 13/42* (2006.01)

(52) U.S. Cl.
CPC ............ *G06F 3/1423* (2013.01); *G06F 21/31* (2013.01); *H04L 63/00* (2013.01); *H04W 4/024* (2018.02); *H04W 4/12* (2013.01); *H04W 4/46* (2018.02); *H04W 4/48* (2018.02); *G06F 13/4282* (2013.01); *G06F 2213/0042* (2013.01); *G08G 1/096866* (2013.01); *G09G 2370/02* (2013.01); *G09G 2370/022* (2013.01); *G09G 2370/16* (2013.01); *G09G 2380/10* (2013.01)

(56) References Cited

U.S. PATENT DOCUMENTS

| | | | | |
|---|---|---|---|---|
| 2016/0311443 | A1* | 10/2016 | Hong | H04N 13/106 |
| 2017/0057475 | A1* | 3/2017 | Lim | B60T 7/22 |
| 2018/0032217 | A1* | 2/2018 | Kim | B60K 37/06 |
| 2018/0134286 | A1* | 5/2018 | Yi | B60W 10/04 |
| 2018/0170256 | A1* | 6/2018 | Medenica | B60Q 9/00 |
| 2019/0096243 | A1* | 3/2019 | Doig | G08G 1/091 |

FOREIGN PATENT DOCUMENTS

| | | |
|---|---|---|
| KR | 10-2015-0069741 A | 6/2015 |
| KR | 10-2015-0127731 A | 11/2015 |
| KR | 10-2016-0013680 A | 2/2016 |
| KR | 10-2016-0032452 A | 3/2016 |
| WO | WO 2015/093823 A1 | 6/2015 |

\* cited by examiner

FIG. 2
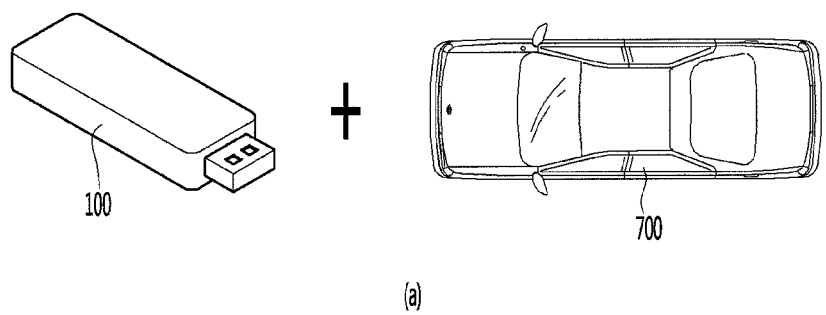
(a)
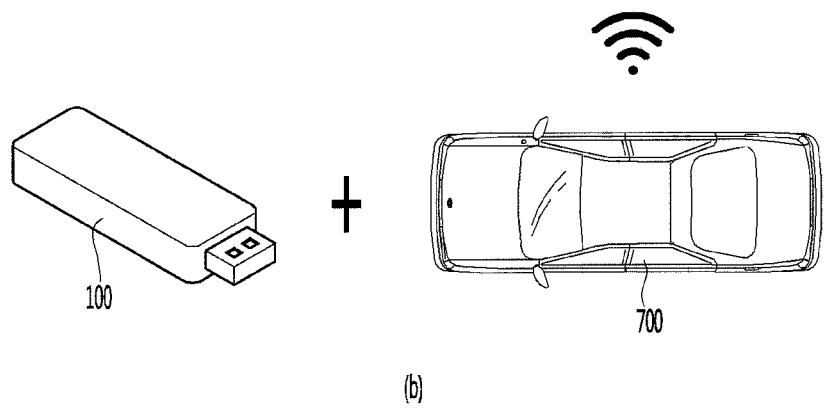
(b)

FIG. 15
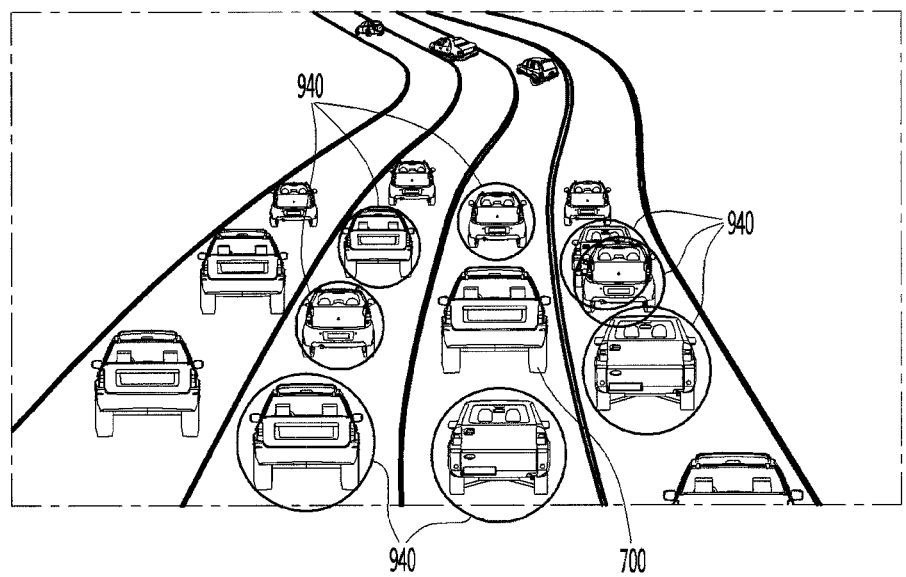
(a)
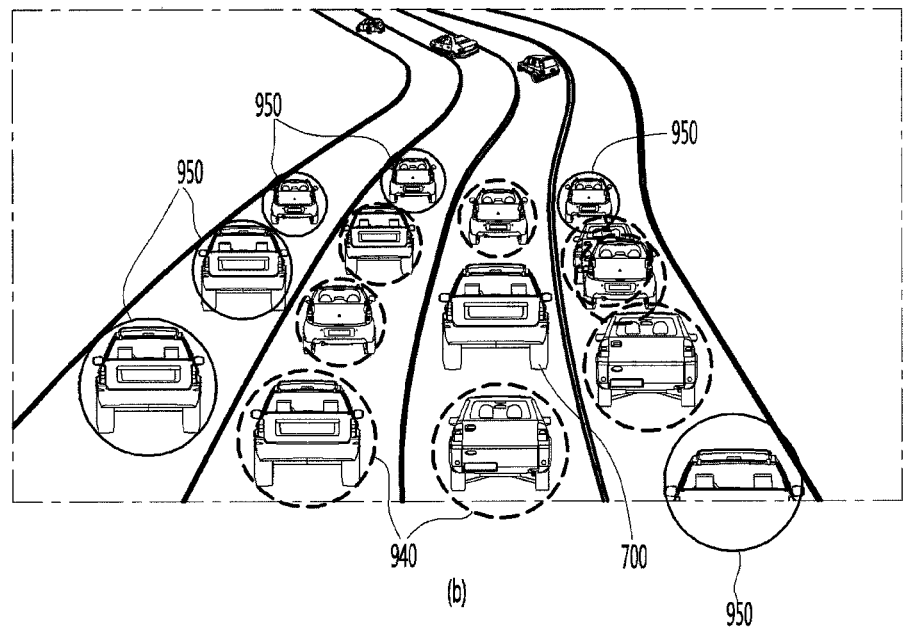
(b)

EXTERNAL MODULE AND VEHICLE CONNECTED THERETO

CROSS-REFERENCE TO RELATED APPLICATION

This application claims the priority benefit of Korean Patent Application No. 10-2016-0037478, filed in the Republic of Korea on Mar. 29, 2016, and Application No. PCT/KR2016/003332, filed on Mar. 31, 2016, all of which are hereby incorporated by reference as if fully set forth herein.

BACKGROUND OF THE INVENTION

Technical Field

The present invention relates to an external module connected to a vehicle and a vehicle connected to the same.

Background Art

A vehicle is an apparatus that transports a user riding therein in a desired direction. A representative example of a vehicle may be an automobile.

A vehicle includes an internal combustion engine vehicle, an external combustion engine vehicle, a gas turbine vehicle, an electric vehicle, etc. according to type of motor used.

The electric vehicle refers to a vehicle for driving an electric motor using electric energy and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or pedestrian.

The intelligent vehicle is an advanced vehicle using information technology (IT) and is also referred to as a smart vehicle. The intelligent vehicle provides optimal traffic efficiency by introduction of an advanced vehicle system and via association with an intelligent traffic system (ITS).

In addition, studies and research on a sensor mounted on the intelligent vehicle have been actively performed. In more detail, a camera, an infrared sensor, radar, a global positioning system (GPS), a Lidar, and a gyroscope have been used for the intelligent vehicle. Among them, the camera occupies an important position while serving as a sensor substituting for the eye of a human being.

Therefore, as various sensors and electronic equipment have been developed, attention has been paid to a vehicle having an advanced driver assistance system (ADAS) function to assist user driving, traveling stability, and the convenience in the driving.

However, a vehicle in which the ADAS function is absent or a weak ADAS function is present, may not be receive the benefits of a new ADAS technology.

In addition, even if the ADAS function is mounted, a vehicle having no a communication function may not receive an advanced ADAS function.

SUMMARY

Technical Problem

The embodiment is to provide an external module for providing an ADAS function to a vehicle and a vehicle connected to the same.

Technical Solution

In order to accomplish the above object, according to an embodiment of the present invention, an external module includes an interface connected to a vehicle to exchange data to the vehicle, and a processor configured to receive surrounding information of the vehicle and state information of the vehicle through the interface, to acquire advanced driver assistance system (ADAS) information based on the surrounding information of the vehicle and the state information of the vehicle, and to transmit the ADAS information to the vehicle through the interface such that an internal display of the vehicle displays the ADAS information.

In addition, the external module may further include a communication unit to exchange data with a terminal in wireless, and the processor may be configured to, through the communication unit, transmit the surrounding information of the vehicle and the state information of the vehicle to the terminal, and receive the ADAS information, which is based on the surrounding information of the vehicle and the state information of the vehicle, from the terminal.

In addition, the external module may further include an input unit to receive user information. When the interface is connected to the vehicle, the processor may be configured to perform authentication by comparing the user information received through the input unit with authentication information which is previously stored, and to receive the surrounding information of the vehicle and the state information of the vehicle through the interface, when the user information is matched with the authentication information.

In addition, the processor may be configured to transmit a control signal to the vehicle through the interface such that the internal display of the vehicle displays an ADAS function that can be provided to the vehicle.

Further, when an ADAS function selected among ADAS functions that are able to be provided to the vehicle is received from the vehicle through the interface, the processor may be configured to transmit a control signal to execute the selected ADAS function to the vehicle such that the selected ADAS function is provided.

In addition, the processor may be configured to transmit a control signal to the vehicle through the interface such that the internal display of the vehicle displays an ADAS function that is unable to be provided to the vehicle.

Further, the processor may be configured to control the internal display of the vehicle to display information on an additional sensor necessary for providing the ADAS function that is unable to be provided to the vehicle and information on installation of the additional sensor.

In addition, the processor may control, when receiving sensor information from the additional sensor, the internal display of the vehicle such that the ADAS function, which is unable to be provided, is changed to an ADAS function, which can be provided and the change result is displayed.

Further, the processor may control the internal display of the vehicle to display that a lane keeping assist system (LKAS) function is unable to be provided to the vehicle.

In addition, the processor may control, when receiving an input of selecting the LKAS function, the internal display of the vehicle to display information on a camera used for providing the LKAS function to the vehicle and information on installation of the camera.

In addition, the processor may control the internal display of the vehicle such that the LKAS function is changed to a function, which can be provided, and is displayed, when receiving image information from a camera additionally installed based on the installation information of the camera.

Further, the processor may acquire, when receiving information from a sensor as the sensor is added to the vehicle, ADAS information based on the surrounding information of the vehicle, the state information of the vehicle, and the information received from the sensor.

In addition, the external module may further include a communication unit to exchange data with a server in wireless. The processor may be configured to acquire information on a specific traveling path and ADAS information, which can be provided by the server in traveling along the specific traveling path, through the communication unit, and to transmit a control signal to the vehicle through the interface such that the internal display of the vehicle displays the ADAS information which can be provided by the server.

In addition, the external module may further include a communication unit to exchange data with another vehicle in wireless. The processor may be configured to, through the communication unit, transmit the surrounding information of the vehicle and the state information of the vehicle to another vehicle, and to receive the ADAS information, which is based on the surrounding information of the vehicle and the state information of the vehicle, from the another vehicle.

Further, the processor may be configured to directly compute the ADAS information based on the surrounding information of the vehicle and the state information of the vehicle.

According to another embodiment of the present invention, a vehicle including a sensor to acquire vehicle surrounding information and a display to display ADAS information. The vehicle includes an interface connected to an external module to exchange data with the external module and a processor configured to transmit, to the external module, the vehicle surrounding information through the interface, to receive ADAS information based on the vehicle surrounding information from the external module, and to control the display to display the ADAS information.

In addition, the vehicle may further include an input unit configured to receive user information.

When the interface is connected to the external module, the processor may be configured to perform authentication by comparing the user information received through the input unit with authentication information which is previously stored, and to transmit, to the external module, the vehicle surrounding information through the interface, when the user information is matched with the authentication information.

Advantageous Effect

According to the external module of the embodiment, as the vehicle having no communication function is connected to the external module, the vehicle may have the communication function (e.g., the embodied invention can turn a "dumb vehicle" into a "smart vehicle").

In addition, the vehicle connected to the external module may transmit surrounding information of the vehicle and state information of the vehicle to the outside.

Further, the external module may receive user information and may perform authentication, thereby improving the security.

In addition, the vehicle connected to the external module may receive information on an available ADAS function.

In this instance, the vehicle connected to the external module may receive the available ADAS function.

In addition, the vehicle connected to the external module may receive information on an ADAS function which is unable to be used.

In this instance, the vehicle connected to the external module may receive information on an additional necessary sensor to use the ADAS function which is unable to be used.

Further, the vehicle connected to the external module may receive new ADAS function as the sensor is added to the vehicle.

In addition, as a vehicle having no ADAS function is connected to the external module, the vehicle may now be able to receive the ADAS function after it is connected to the external module.

Further, the vehicle having the ADAS function is connected to the external module, thereby receiving an optimized ADAS function or a new ADAS function.

BRIEF DESCRIPTION OF THE DRAWINGS

FIG. 2 illustrates a vehicle connected to an external module configured to provide a communication function, in which the vehicle has no native communication function according to an embodiment of the present invention.

FIG. 15 illustrates an embodiment of recognizing one or more vehicles around a vehicle by using the external module and the server.

DETAILED DESCRIPTION OF THE EMBODIMENTS

Figure 1:
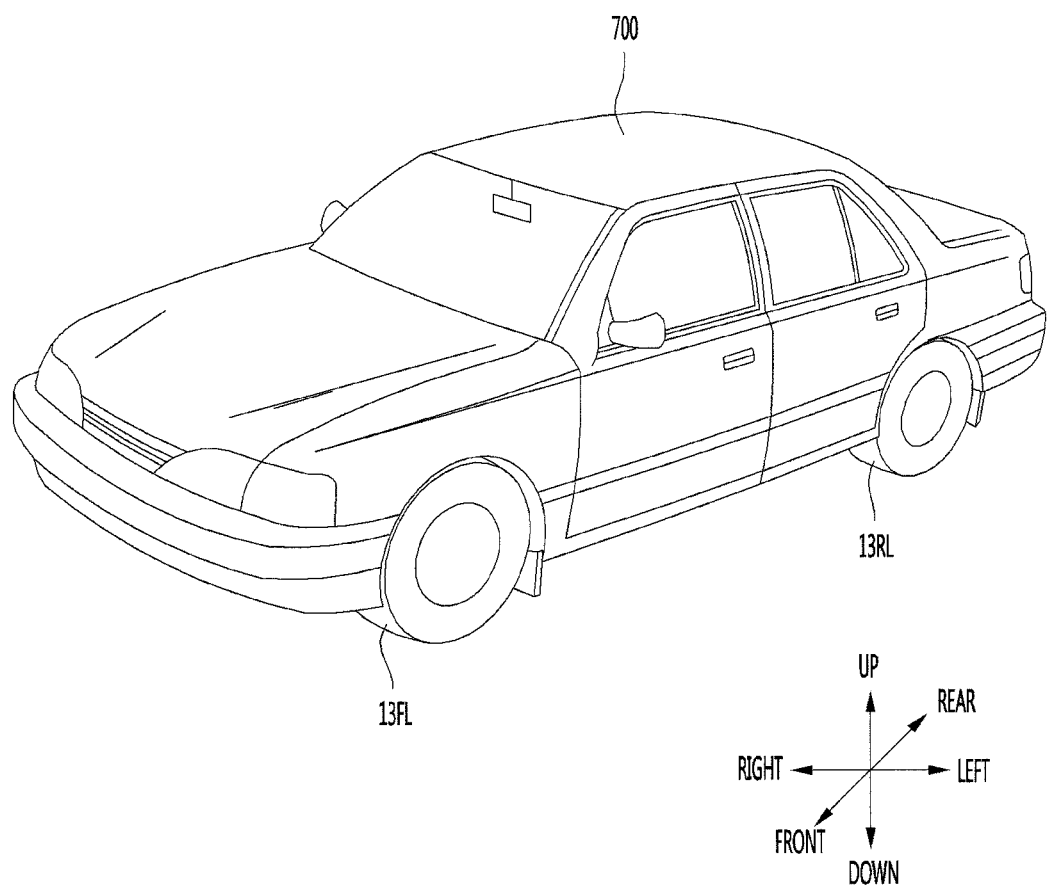
FIG. 1 is a diagram showing the appearance of a vehicle connected to an external module according to an embodiment of the present invention.

Hereinafter, embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises," includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon.

A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle means the left of the vehicle in the direction of travel and the right of the vehicle means the right of the vehicle in the direction of travel.

In the following description, a left hand drive (LHD) vehicle will be focused upon unless otherwise stated.

Hereinafter, the external module according to the embodiment will be described in detail with reference to the drawings.

Referring to FIG. 1, the vehicle 700 connected to the external module according to the embodiment may include wheels 13FL and 13RL rotated by a power source and a vehicle assistance apparatus interfacing with the external module.

Referring to FIG. 2, according to the embodiment, the vehicle 700 connected to an external module 100 is mainly classified into a vehicle 700 equipped with a communication function to be able to make wireless communication (V2X) with an external server or another subject and a vehicle 700 having no communication function.

Part (a) of FIG. 2 shows that the external module 100 is connected to the vehicle 700 having no communication function, and (b) of FIG. 2 shows that the external module 100 is connected to the vehicle 700 equipped with the communication function.

Figure 3:
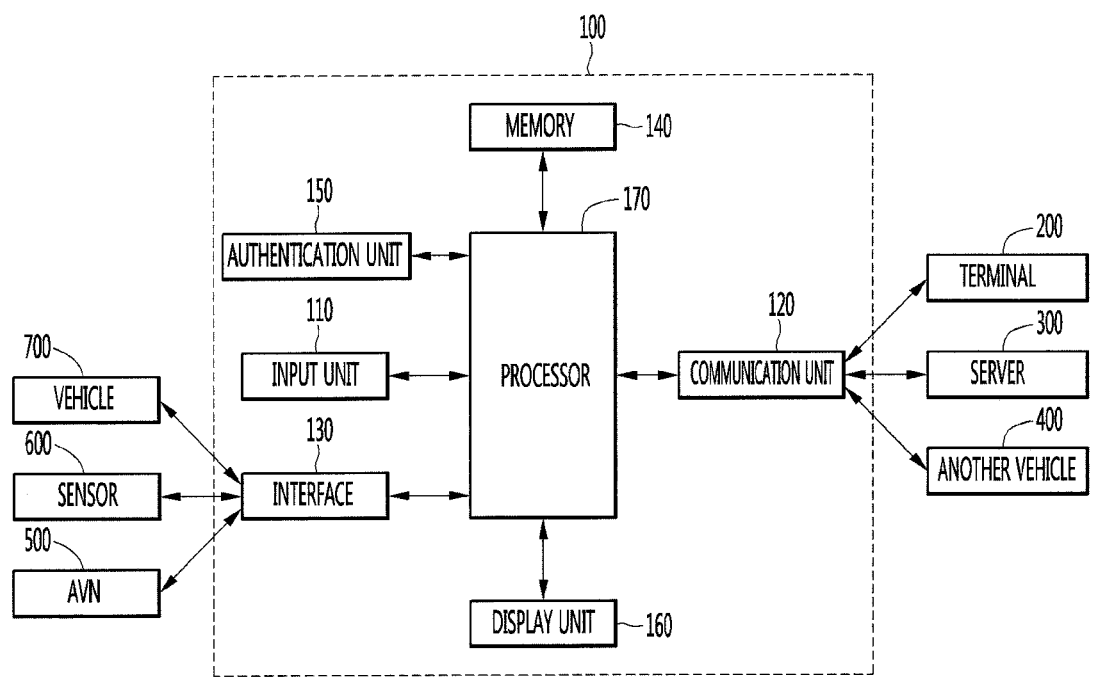
FIG. 3 is a block diagram of an external module according to an embodiment of the present invention.

Referring to FIG. 3, such an external module 100 may include an input unit 110, a communication unit 120, an interface 130, a memory 140, an authentication unit 150, a display unit 160, and a processor 170. The units of the external module 100 shown in FIG. 3 may not be used in the implementation of the external module 100 and thus the external module 100 described in the present specification may have components greater or less in number than the number of the above-described components.

Each component will now be described in detail. The external module 100 may include the input unit 110 for receiving user input.

In addition, user information may be authenticated. This is performed to determine whether a user of a vehicle 700, which is allowed, accesses the external module 100. For the authentication, there may be included at least one of a scheme of inputting a series of passwords serving as user information, and biometric recognition schemes such as a fingerprint recognition scheme, a pupil recognition scheme, and a voice recognition scheme.

According to an embodiment, the input unit 110 employs a fingerprint sensor to acquire fingerprint information of a user, and the user authentication based on the fingerprint recognition scheme may be suitable for the external module 100 implemented in compact size.

For example, the user inputs a setting for the remote start restriction function of the vehicle assistance apparatus through the input unit 110, or a performing input for turning on/off the power of the vehicle assistance apparatus, and the like can be performed.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the external module 100 may include the communication unit 120 for communicating with a terminal 200, a server 300, and another vehicle 400.

The external module 100 according to the embodiment may transmit and receive information on a driving assist function (ADAS) with the server 300 through the communication unit 120. In more detail, the external module 100 may transmit information on the vehicle 700 to the server 300 and may receive the information on the driving assist function, which is created based on the information on the vehicle 700, from the server 300. In addition, the communication unit 120 may receive information on the control over the vehicle 700 from the server 300 to provide the driving assist function to the vehicle 700. In this instance, the driving assist function may refer to an "Advanced Driver Assistance System (ADAS)" function, and will be referred to as "ADAS function".

The ADAS function refers to a technology of assisting driving for the convenience and the safety of a driver of the vehicle 700, and the information on the control over the vehicle 700 is related to a series of operations including steering, accelerating, decelerating, and stopping the vehicle 700 to perform the driving assist function.

The ADAS information includes at least one information of the type of an ADAS function, which can be provided to the vehicle 700 based on surrounding information of the vehicle 700 and the state information of the vehicle 700, a control command to execute the ADAS function which can be provided, the type of an ADAS function which is unable to be provided to the vehicle 700, and information on a sensor additionally necessary for providing the ADAS function which is unable to be provided.

Hereinafter, several ADAS functions according to an embodiment of the present invention will be described.

An adaptive cruise control (ACC) is a system to automatically control a driving speed and an inter-vehicle distance. This system runs in the driving speed range of about 30 km/h-200 km/h and significantly reduces the driving burden on a driver during driving. To embody the ACC, a radar sensor, a yaw rate sensor, a lateral acceleration sensor, a wheel speed sensor, and a steering angle sensor are necessary.

A Lane keeping assist (LKAS) is a system to automatically return a vehicle, which deviates from a lane, to the original position thereof. A lane keeping warning (LWS) is a system to warn that a vehicle deviates from a lane. This system allows the vehicle to automatically turn a steering wheel thereof or warns a driver of the deviation from the lane when the driver makes a vehicle deviating from a lane due to the drowsy driving or the carelessness.

Traffic sign recognition (TSR) is a technology allowing a vehicle to recognize a sign board for speed limit, child protection, and forward rotation, in front of the vehicle.

A forward collision warning (FCW) is a technology of warning forward collision when it is difficult for a driver to properly cope with an obstacle positioned on a traveling path of the vehicle. The FCW is to analyze and warn the movement of a front vehicle, time taken until a potential collision, and the collision state of a target vehicle.

A traffic jam assist (TJA), which is a technology of assisting the driving in a congestion section, is to maintain the distance from a front vehicle in the congestion traffic jam section and to stop the vehicle if necessary.

An autonomous emergency braking (AEB) is a technology of automatically working a brake in an expected collision situation to prevent an accident and to minimize the damage caused by the collision. To embody the AEB, radar and a camera are used.

In addition, the external module 100 may receive communication information including at least one of navigation information, driving information of another vehicle 400, and traffic information, in addition to information on the ADAS through the communication unit 120. In contrast, the external module 100 may transmit information on a subject vehicle 700 through the communication unit 120.

In more detail, the communication unit 120 may receive at least one of position information, weather information and road traffic condition information (e.g., transport protocol experts group (TPEG), etc.) from the mobile terminal 200 and/or the server 300.

In addition, the communication unit 120 may receive traffic information from the server 300 having an intelligent traffic system (ITS). Here, the traffic information may include traffic signal information, lane information, vehicle surrounding information or position information.

In addition, the communication unit 120 may receive navigation information from the server 300 and/or the mobile terminal 200. Here, the navigation information may include at least one of map information related to vehicle driving, lane information, vehicle position information, set destination information and route information according to the destination.

In addition, the communication unit 120 may receive the real-time position of the vehicle 700 as the navigation information. In more detail, the communication unit 120 may include a global positioning system (GPS) module and/or a Wi-Fi (Wireless Fidelity) module and acquire the position of the vehicle 700.

In addition, the communication unit 120 may receive driving information of the another vehicle 400 from the another vehicle 400 and transmit information on the vehicle 700, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle 700, the mobile terminal 200 of the user and the external module 100 may pair with each other automatically or by executing a user application.

The communication unit 120 may exchange data with the another vehicle 400, the mobile terminal 200 or the server 300 in a wireless manner.

In more detail, the communication unit 120 can perform wireless communication using a wireless data communication method. As the wireless data communication method, technical standards or communication methods for mobile communications (for example, Global System for Mobile Communication (GSM), Code Division Multiple Access (CDMA), CDMA 2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

In addition, the vehicle assistance apparatus 100 may pair with the mobile terminal 200 located inside the vehicle 700 using a short-range communication method and wirelessly exchange data with the another vehicle 400 or the server 300 using a long-distance wireless communication unit of the mobile terminal 200.

Next, the external module 100 may include the interface 130 for receiving data of the vehicle and transmitting a signal processed or generated by the processor 170.

In more detail, the external module 100 may receive at least one of surrounding information of a vehicle, state information of the vehicle, the ADAS information, the driving information of the another vehicle 400, navigation information, and sensor information through the interface 130.

In addition, the external module 100 may transmit a control signal to execute an ADAS function of the vehicle 700, or information generated from the external module 100 to the controller 770 of the vehicle 700 through the interface 130.

In other words, according to the embodiment, the interface 130 may receive the surrounding information of the vehicle and the state information of the vehicle from the vehicle 700 through wired communication. The interface 130 may transmit, to the vehicle 700, the ADAS information created based on the surrounding information of the vehicle and the state information of the vehicle.

The surrounding information of the vehicle 700 includes information sensed by the sensor 600 mounted on the vehicle 700 or embedded in the vehicle 700. For example, the surrounding information of the vehicle 700 may include information sensed by a distance sensor 600 mounted on the vehicle 700, an image captured by the camera to sense the rear portion of the vehicle 700, or an image captured by a camera for photographing the front portion of the vehicle 700.

The state information of the vehicle 700 is information on whether a control function necessary to provide the ADAS function is provided in the vehicle, like information on whether the brake control of the vehicle is possible, whether the steering control is possible, whether the control of an acceleration pedal is possible, whether the control of the internal display of the vehicle is possible, or whether the control of a transmission is possible.

Thus, the interface 130 may perform data communication with at least one of the controller 770 of the vehicle, an audio-video-navigation (AVN) apparatus 400 and a sensing unit 760 using a wired or wireless communication method.

In more detail, the interface 130 may receive navigation information by data communication with the controller 770, the AVN apparatus 500 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 724 of the vehicle 700. The interface 130 may receive user input from the input unit 724 of the vehicle 700 or via the controller 770. That is, when the input unit is provided in the vehicle, user input may be received via the interface 130.

In addition, the interface 130 may receive traffic information acquired from the server 300. The server 300 may be located at a traffic control surveillance center for controlling traffic. For example, when traffic information is received from the server 300 via the communication unit 710 of the vehicle 700, the interface 130 may receive traffic information from the controller 770.

Next, the memory 140 may store a variety of data for overall operation of the external module 100, such as a program for processing or control of the controller 170.

In addition, the memory 140 may store data and commands for operation of the external module 100 and a plurality of application programs or applications executed in the external module 100. At least some of such application programs may be downloaded from an external server 300 through wireless communication. At least one of such application programs may be installed in the external module 100 upon release, in order to provide the basic function (for example, driving assistance information guide function) of the external module 100.

Such application programs may be stored in the memory 140 and may be executed to perform operation (or function) of the external module 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through a camera.

For example, the memory 140 may store data for checking the object using the predetermined algorithm when the predetermined algorithm such as a lane, a traffic sign, a two-wheeled vehicle and a pedestrian is included in an image acquired through the camera.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the external module 100 may operate in association with a network storage for performing a storage function of the memory 140 over the Internet.

In addition, authentication information to authenticate user information may be stored, and the stored authentication information is compared with user information input through the input unit 110. For authentication, the user information may include a series of passwords or biometric recognition information which includes at least one of fingerprint recognition, pupil recognition, and voice recognition.

Next, the display unit 160 may display the state information of the external module 100. The state information of the external module 100 includes the connection state between the external module 100 and the vehicle 700, the communication state between the external module 100 and the terminal 200 or the server 300, or information on a power supply state of the external module 100.

The external module 100 may include the processor 170 for controlling overall operation of the units of the external module 100.

In addition, the processor 170 may control at least some of the components described with reference to FIG. 3 in order to execute the application program. Further, the processor 170 may operate by combining at least two of the components included in the external module 100, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for the implementation of other functions.

The processor 170 may be controlled by the controller or may control various functions of the vehicle 700 through the controller.

The processor 170 may control overall operation of the external module 100 in addition to operation related to the application programs stored in the memory 140. The processor 170 may process signals, data, information, etc. via the above-described components or execute the application programs stored in the memory 140 to provide appropriate information or functions to the user.

Figure 4:
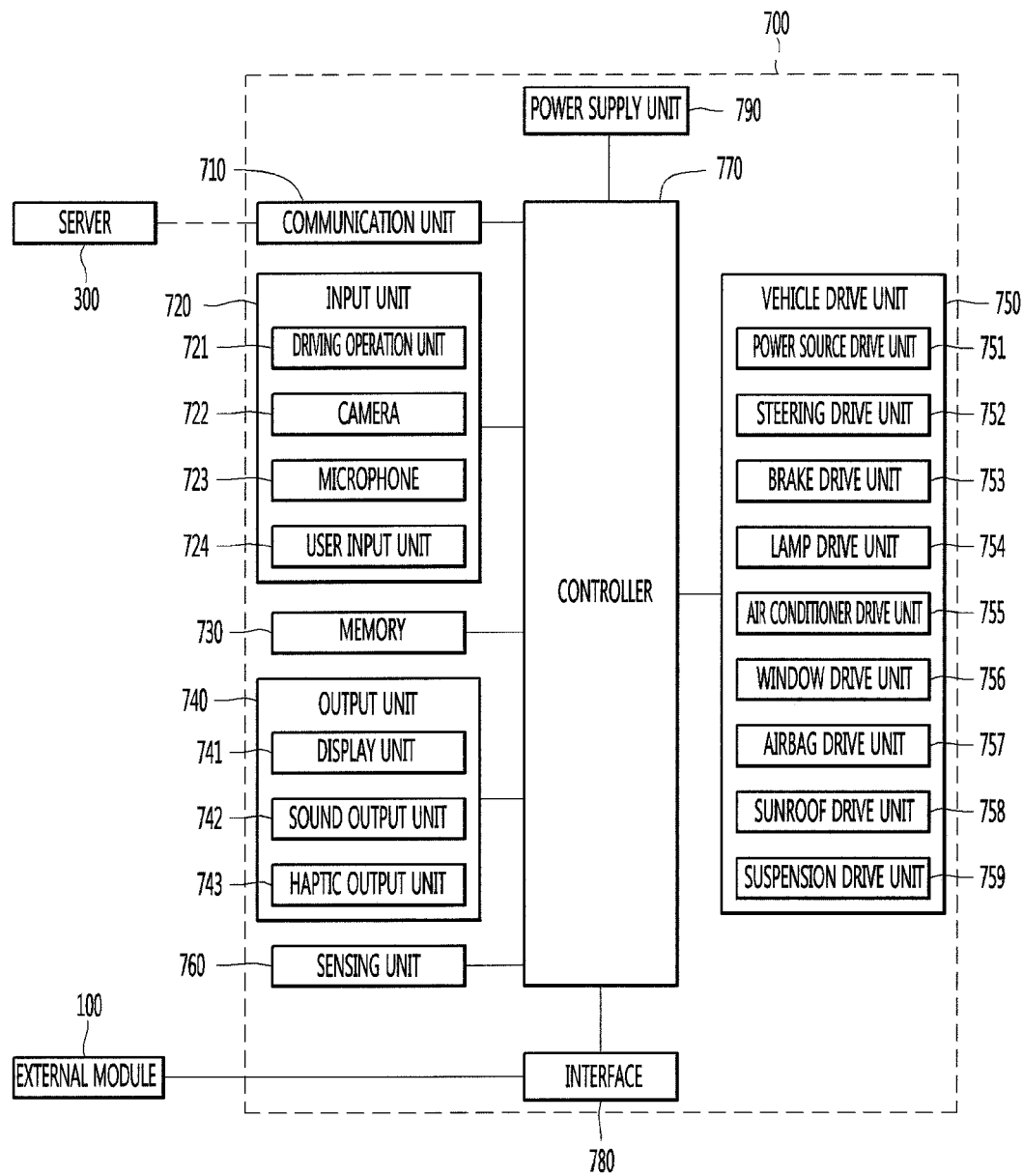
FIG. 4 is a block diagram illustrating the internal configuration of the vehicle connected to the external module shown in FIG. 1 according to an embodiment of the present invention.

Hereinafter, the vehicle 700 connected to the external module 100 according to the embodiment of the present invention will be described with reference to FIG. 4.

The vehicle 700 may include a communication unit 710, an input unit 720, a sensing unit 760, an output unit 740, a vehicle drive unit 750, a memory 730, an interface 780, a controller 770, a power supply unit 790, an external module 100 and AVN apparatus 400. Here, among the units included in the external module 100 and the units of the vehicle 700, the units having the same names are described as being included in the vehicle 700.

The communication unit 710 may include one or more modules which permit communication such as wireless communication between the vehicle and the mobile terminal 200, between the vehicle and the external server 300 or between the vehicle and the another vehicle 400. Further, the communication unit 710 may include one or more modules which connect the vehicle to one or more networks.

The input unit 720 may include a driving operation unit 721, a camera 195, a microphone 723 and a user input unit 724.

The driving operation unit 721 receives user input for driving of the vehicle.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some embodiments, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some embodiments, the user input unit 724 may be located in a region of the steering wheel. In this instance, the driver may operate the user input unit 724 with the fingers while gripping the steering wheel.

The sensing unit 760 is configured to sense signals associated with, for example, signals related to driving of the vehicle. Thus, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the microphone 723 may operate as a sensor.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this instance, the display unit 741 may include a touch sensor which senses a touch to the display unit 741 to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

In addition, the display unit 741 may include a cluster to allow the driver to check vehicle state information or vehicle traveling information while driving the vehicle. The cluster may be located on a dashboard. In this instance, the driver may check information displayed on the cluster while looking forward.

In addition, in some embodiments, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 170 into audio signals and to output the audio signals. Thus, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the situation where a fossil fuel based engine is a power source, the power source drive unit 751 may perform electronic control of the engine. As such, the power source drive unit 751 may control, for example, an output torque of the engine. In the situation where the power source drive unit 751 is an engine, the power source drive unit 751 may control the speed of the vehicle by controlling the output torque of the engine under the control of the controller 770.

In another example, in the situation where an electric motor is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus inside the vehicle. For example, the sunroof drive unit 758 may control opening or closing of a sunroof.

The suspension drive unit 759 may perform electronic control of a suspension apparatus inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 200 and may be connected to the mobile terminal 200 via the port. In this instance, the interface 780 may exchange data with the mobile terminal 200.

The interface 780 may serve as a passage for providing electric energy to the connected mobile terminal 200. When the mobile terminal 200 is electrically connected to the interface 780, the interface 780 may provide electric energy supplied from the power supply unit 790 to the mobile terminal 200 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the vehicle assistance apparatus or the external module 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the external module 100 may be directly set in the controller 770 of the vehicle. In such an embodiment, the external module 100 may be understood as a combination of some components of the vehicle.

Alternatively, the controller 770 may control the components to transmit information requested by the processor 170.

The power supply unit 790 may supply power to operate the respective components under the control of the controller 770. In particular, the power supply unit 790 may receive power from, for example, a battery inside the vehicle.

The AVN apparatus 500 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

Figure 5:
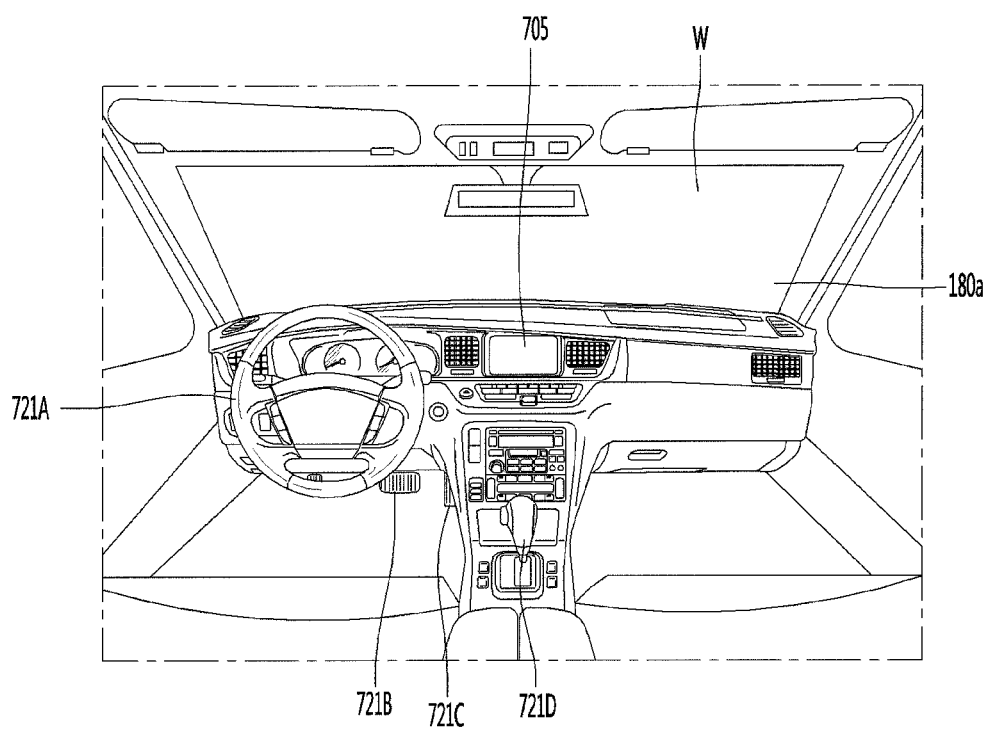
FIG. 5 is a diagram illustrating the inside of a vehicle connected to an external module according to an embodiment of the present invention.

FIG. 5 shows an internal display of the vehicle. The internal display of the vehicle may include at least one of an additional display and a display of the terminal as well as a display included in the vehicle. The internal display of the vehicle may be controlled by the external module.

In more detail, the display unit 180 may include a first display 180*a* for projecting and displaying a graphic image onto and on a vehicle windshield W. That is, the first display 180*a* is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 705 separately provided inside the vehicle to display an image of the driving assistance function.

In more detail, the second display 705 may be a display of a vehicle navigation apparatus or a cluster located at an internal front side of the vehicle.

The second display 705 may include at least one selected from among a Liquid Crystal Display (LCD), a Thin Film Transistor LCD (TFT LCD), an Organic Light Emitting Diode (OLED), a flexible display, a 3D display, and an e-ink display.

The second display 705 may be combined with a touch input unit to achieve a touchscreen.

Figure 6:
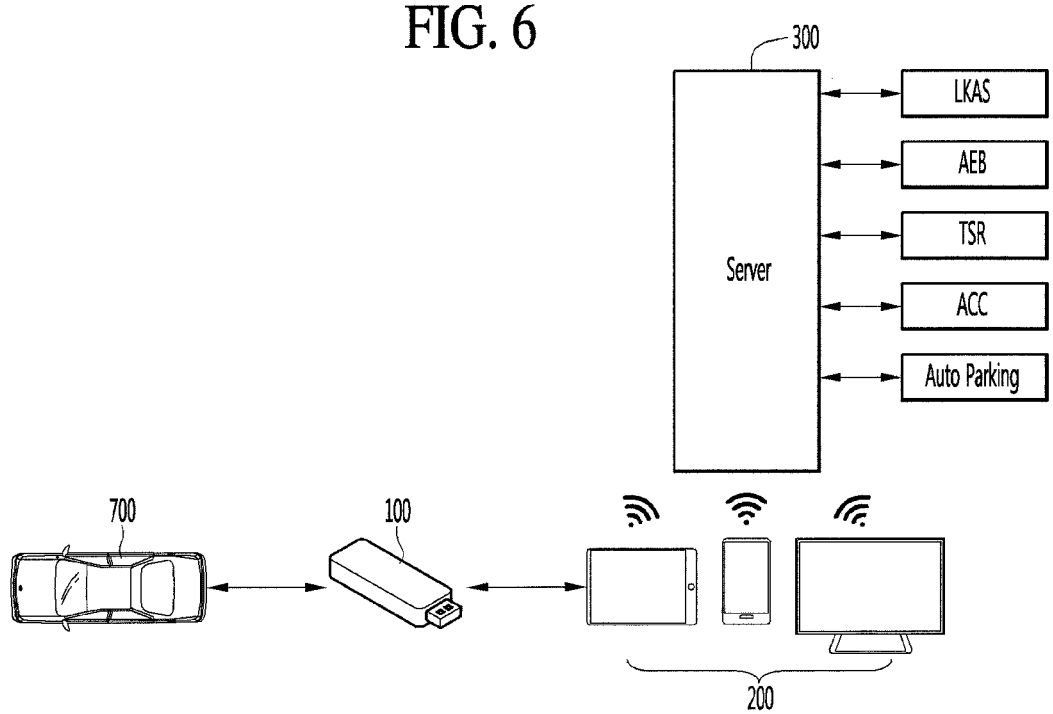
FIG. 6 illustrates a system in which the external module according to the embodiment of the present invention communicates with the server through the terminal.

FIG. 6 shows a system in which the external module 100 according to the embodiment of the present invention performs communication with the server 300 through the terminal 200. Referring to the drawing, the vehicle 700, the external module 100, the terminal 200, and the server 300 constitute the system.

In the embodiment, the vehicle 700, which is connected to the external module 100, has no native communication function previously built-in.

In addition, the external module 100 is physically connected to the vehicle 700 to exchange data with the vehicle 700. The expression of "being physically connected" refers to that the external module 100 and the vehicle 700 are not connected to each other in wireless.

The external module 100 may be physically connected to or disconnected from a vehicle 700 and may use a port of the vehicle 700 for connection or disconnection. For example, the external module 100 can include an interface, such as a universal serial bus (USB) connector to be detachably coupled to the USB port of the vehicle 700. Since such an external module 100 is easily connected to or disconnected from the vehicle 700, a user may select an external module 100 providing a desired ADAS function and may connect the external module 100 with the vehicle 700 to use a necessary ADAS function. For example, the external module 100 can be a portable device, such as a thumb drive or a dongle, which is configured to be connected to the vehicle by insertion.

In other words, according to the embodiment, through the interface 130, the external module 100 may exchange data with the vehicle 700 and may receive surrounding information of the vehicle 700 and state information of the vehicle 700 from the vehicle 700.

The surrounding information of the vehicle 700 includes information sensed by the sensor mounted on the vehicle 700 or embedded in the vehicle 700.

For example, the surrounding information of the vehicle 700 may include information sensed by the distance sensor mounted on the vehicle 700, an image captured by the camera used to sense the rear portion of the vehicle 700, or an image captured by a camera used to photograph the front portion of the vehicle 700.

The state information of the vehicle 700 is information on whether a control function necessary to provide the ADAS function is provided in the vehicle 700, like information on whether the brake control of the vehicle 700 is possible, whether the steering control is possible, whether the control of an acceleration pedal is possible, whether the control of the internal display of the vehicle 700 is possible, or whether the control of a transmission is possible.

The external module 100 may transmit the surrounding information of the vehicle 700 and the state information of the vehicle 700 to the server 300, and the server 300 may transmit, to the external module 100, the ADAS information computed based on the surrounding information of the vehicle 700 and the state information of the vehicle 700 again. Through these processes, the vehicle 700 may execute the ADAS function based on the ADAS information.

In this process, the external module 100 may use the terminal 200 through long distance wireless communication. The following embodiment will be described while focusing on that the external module 100 performs communication with the terminal 200 through short-range wireless communication and the terminal 200 makes communicate with the server 300 through the long distance wireless communication, so the information related to the ADA is transmitted and received.

In more detail, the external module 100 transmits, to the terminal 200, the surrounding information of the vehicle 700 and the state information of the vehicle 700, which are received through the communication unit 120.

In addition, the terminal 200 transmits, to the server 300, the surrounding information of the vehicle 700 and the state information of the vehicle 700 which are received from the external module 100.

The server 300 having the information received therein acquires ADAS information based on the surrounding information of the vehicle 700 and the state information of the vehicle 700 which are received from the terminal 200.

In this instance, the ADAS information includes at least one of information on the type of an ADAS function, which can be provided to the vehicle 700, a control command to execute the ADAS function which can be provided, information on the type of an ADAS function which is unable to be provided to the vehicle 700, and information on a sensor additionally necessary for providing the ADAS function which is unable to be provided. In other words, the server 300 performs a computation to acquire the ADAS information based on the surrounding information of the vehicle 700 and the state information of the vehicle 700. In addition, the server 300 transmits the acquired ADAS information to the terminal 200.

The terminal 200 having the ADAS information received therein transmits the ADAS information to the external module 100.

The external module 100 having the ADAS information received therein may transmit the ADAS information to control an internal display of the vehicle 700 to display the ADAS function, which can be provided and the ADAS which is unable to be provided.

For example, the external module 100 may transmit the ADAS information to the internal display of the vehicle 700 through the interface 130 and may control the internal display of the vehicle 700 to display the description or the information on the ADAS function, which can or unable to be provided to the vehicle 700.

In addition, the external module 100 may transmit the ADAS information to the terminal 200 through the communication unit 120 and may control the terminal to display the description or the information on the ADAS function, which can or unable to be provided to the vehicle 700, A user may select a necessary one of ADAS functions which are able to be provided. The selection of the ADAS function by the user may be achieved through an internal input unit of the vehicle 700, an input unit of the external module 100, or the input unit of the terminal 200.

If the ADAS function selected by the user is input, the external module 100 transmits, to the vehicle 700, control information of the vehicle 700, which is used to provide the ADAS function, through the interface 130. In other words, the external module 100 may transmit, to the controller of the vehicle 700, a control command for the ADAS function selected through the interface 130.

In more detail, the external module 100 continuously transmits, to the server 300, the surrounding information of the vehicle 700 and the state information of the vehicle 700 to execute the ADAS function selected by the user and, if receiving the control command for the ADAS function, which is computed based on the surrounding information and the state information of the vehicle 700, from the server 300, transmits the control command to the vehicle 700, thereby controlling the vehicle 700 to execute the selected ADAS function. In other words, the external module 100 may serve as a broker to provide data related to the ADAS information between the vehicle 700 and the server 300 and may provide an ADAS function to the vehicle 700 having no ADAS function.

In addition, the controller of the vehicle 700 having the control command for the ADAS function, which is received therein, may control the driving unit of the vehicle 700 in response to the received control command, thereby providing the ADAS function. In more detail, the controller of the vehicle 700 may execute the selected ADAS function by operating at least one of a steering wheel, a brake, a lamp, a suspension, or a power source in response to the received control command.

In other words, the external module 100 according to the embodiment may allow the server 300, which provides a complex computation, to execute an ADAS function and an ADAS function which is newly advanced through the wired/wireless communication and thus may assist the vehicle 700 such that the ADAS function, which is unable to be provided by an existing vehicle, is executed by the vehicle 700.

Figure 7:
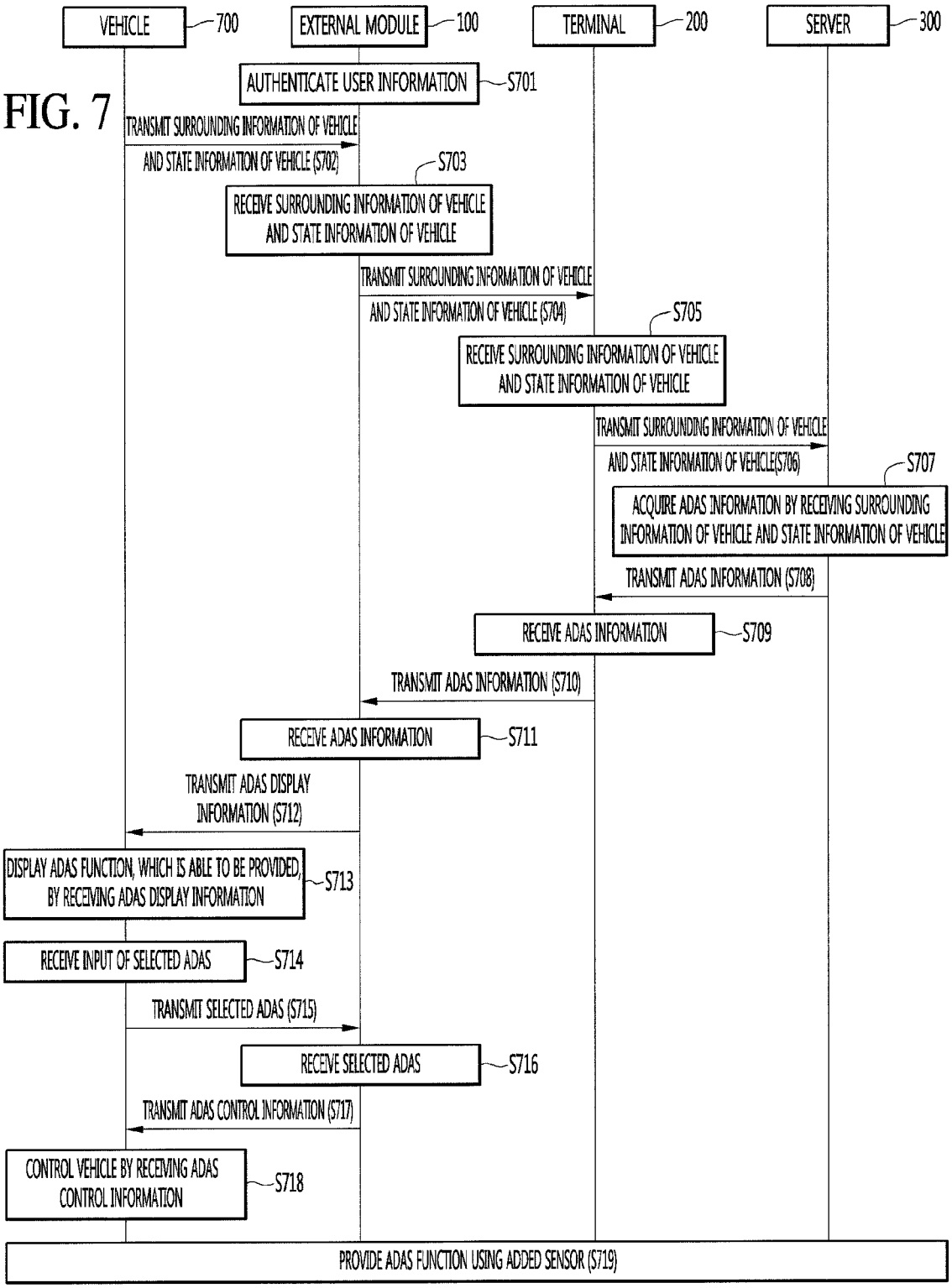
FIG. 7 is a flowchart in which the external module provides an ADAS function to the vehicle in a system shown in FIG. 6 according to an embodiment of the present invention.

FIG. 7 is a flowchart that the external module 100 provides the ADAS function to the vehicle 700 in the system shown in FIG. 6. The details thereof will be described below step by step.

When the external module 100 is physically connected to the vehicle 700, the external module 100 may authenticate user information (S701).

In addition, if the user information is matched with user information previously stored in the external module 100, the user information may be authenticated.

If the user information is authenticated, the external module 100 controls the vehicle 700 to transmit the surrounding information of the vehicle 700 and the state information of the vehicle 700 to the external module 100 (S702).

In addition, the external module 100 receives the surrounding information of the vehicle 700 and the state information of the vehicle 700 from the vehicle 700 through the interface 130 (S703).

Next, the external module 100 transmits the surrounding information of the vehicle 700 and the state information of the vehicle 700, which are received therein, to the terminal 200 through the communication unit 120 (S704).

The external module 100 controls the terminal 200 to receive the surrounding information of the vehicle 700 and the state information of the vehicle 700 from the external module 100 through a short-range wireless communication (S705).

In addition, the external module 100 controls the terminal 200 to transmit the surrounding information of the vehicle 700 and the state information of the vehicle 700 to the server 300 through long distance wireless communication (S706).

Next, the server 300 receives the surrounding information of the vehicle 700 and the state information of the vehicle 700 from the terminal 200 and acquires ADAS information computed based on the surrounding information of the vehicle 700 and the state information of the vehicle 700 (S707).

Thereafter, the server 300 transmits the ADAS information to the terminal 200 through the long distance wireless communication (S708).

In addition, the external module 100 controls the terminal 200 to receive the ADAS information from the server 300 through the short-range wireless communication (S709).

In addition, the external module 100 controls the terminal 200 to transmit the ADAS information, which is received from the server 300, to the external module 100 through the short-range wireless communication (S710).

Thereafter, the external module 100 receives the ADAS information from the terminal 200 through the short-range wireless communication (S711).

In addition, the external module 100 transmits display information, so the internal display of the vehicle 700 displays the ADAS function which can be provided (S712).

The external module 100 controls the internal display of the vehicle 700 to display the ADAS function which can be provided through the interface (S713).

In addition, the external module 100 receives a user input of a specified ADAS function selected from among ADAS functions which are able to be provided (S714).

In other words, the vehicle 700 transmits information on the ADAS function, which is selected through the interface, to the external module 100 (S715).

Although FIG. 7 shows that the input of the specified ADAS function, which is selected, is received, the selection and the input of the specified ADAS function may be made on the external module 100 or the terminal 200 as described above.

The external module 100 receives the input of the selected ADAS function and transmits ADAS control information for executing the ADAS function to the vehicle 700 (S717). In this process, the external module 100 may transmit or receive the data, which is related to the ADAS function continuously selected through the terminal 200, with the server 300.

The vehicle 700 receives the ADAS control information and thus is controlled (S718).

In other words, the external module 100 according to the embodiment may allow the server 300 to provide a complex computation to execute the ADAS function and the ADAS function, which is newly improved, through the wired/wireless communication and thus may assist the vehicle 700 such that the ADAS function, which is unable to be provided by an existing vehicle 700, is executed by the vehicle 700.

Hereinafter, the details will be made with reference to FIG. 8 with respect to a procedure of adding a sensor and a step of providing the ADAS function using the additional sensor to activate the ADAS function which is unable to be provided (S719).

The procedure of adding of the sensor to the vehicle will be described while distinguishing between the situation that the sensor is added to provide the ADAS function, which is unable to be provided, based on the surrounding information of the vehicle and the state information of the vehicle and the situation that the sensor is added regardless of the surrounding information of the vehicle and the state information of the vehicle.

First, the description will be made regarding the situation that the sensor is added to provide the ADAS function which is unable to be provided, based on the surrounding information of the vehicle 700 and the state information of the vehicle 700.

The external module 100 may control the internal display of the vehicle 700 through the interface 130 to display the ADAS function which is unable to be provided. In this instance, the external module 100 may control the internal display of the vehicle 700 to additionally display the description or the information of the ADAS function which is unable to be provided through the interface 130.

In more detail, the external module 100 may control the internal display of the vehicle 700 to display information on the sensor additionally necessary to provide the ADAS function which is unable to be provided through the interface 130. The information on the sensor additionally necessary may be information provided to the server 300.

The information on the sensor additionally necessary includes information on at least one of the type of a sensor, the number of sensors, or the installation position or the attachment position of the sensor inside the vehicle 700.

The situation that the sensor is added regardless of the surrounding information of the vehicle 700 and the state information of the vehicle 700 refers to that the external module 100 expands or adds the ADAS function based on the information received from the added sensor when the user installs or attaches the sensor onto the inner part of the vehicle 700.

Figure 8:
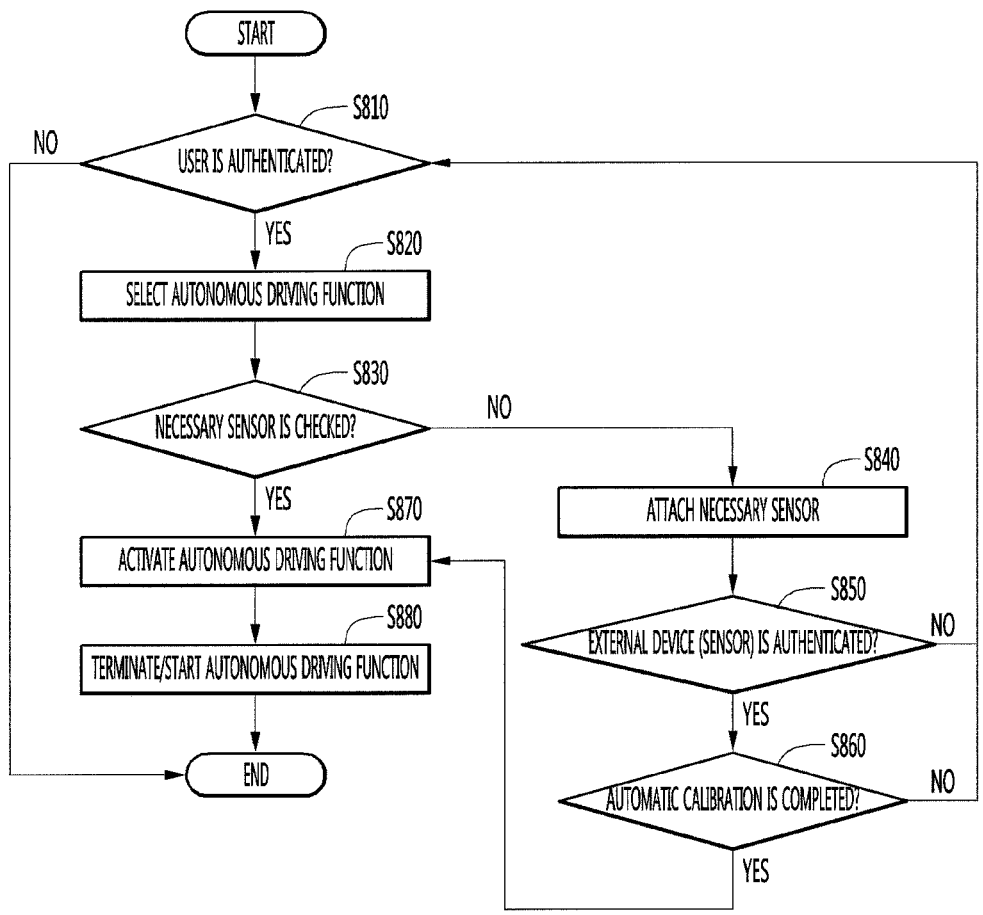
FIG. 8 illustrates an embodiment in which the external module provides an ADAS function using information received from a sensor, as a sensor is additionally provided to a vehicle.

FIG. 8 shows an example of a procedure allowing the external module to lead to add a sensor to provide the ADAS function, which is unable to be provided, and activate the ADAS function, which is unable to be provided, as the sensor is added.

Although an autonomous driving function among the ADAS functions is shown by way of detailed example, even another ADAS function may be applied like the autonomous driving function.

Regarding the description made with accompanying drawings, when the external module 100 is connected to the vehicle 700, the user authentication may be performed (S810).

When the user authentication is performed and thus the user is authenticated, the external module 100 receives information that the autonomous driving function is selected (S820).

In addition, the external module 100 checks whether a necessary sensor is present, in order to provide the selected autonomous driving function (S830).

Next, when the external module 100 determines that the necessary sensor is provided in the vehicle 700, the external module 100 provides the autonomous driving function to the vehicle 700 through the interface 130 (S870).

In addition, when the external module 100 determines that the necessary sensor is absent, the external module 100 provides information such that the necessary sensor is provided (S840). The information on the necessary sensor may be performed in a manner that the external module 100 may control the internal display of the vehicle 700 to display sensor information, through the interface. In addition, the external module 100 may control the display of the terminal 200 to display the sensor information through the communication unit 120.

When the necessary sensor is provided, the external module 100 may perform a procedure of authenticating the added sensor (S850). If the added sensor is authenticated, as the calibration is performed, the information exchanged between the external module 100 and the added sensor is scaled (S860) and the autonomous driving function is activated (S870).

Figure 9:
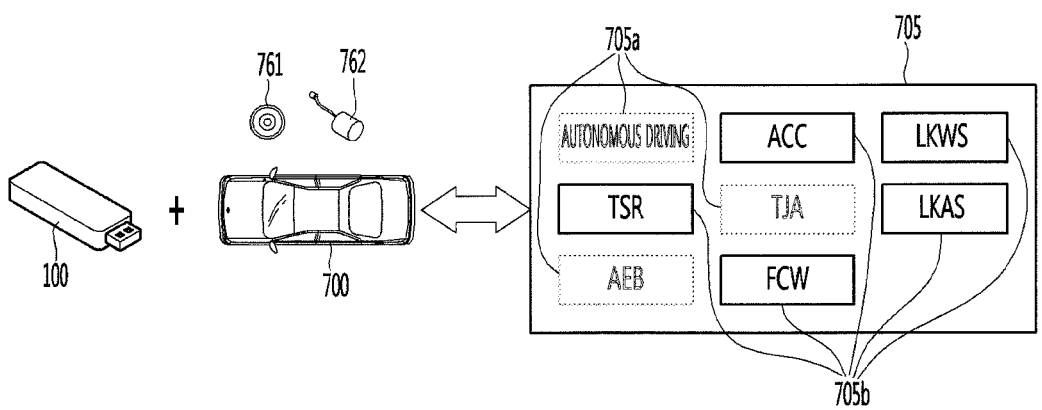
FIG. 9 illustrates an embodiment in which the external module controls an internal display of a vehicle to perform a display operation.
Figure 10:
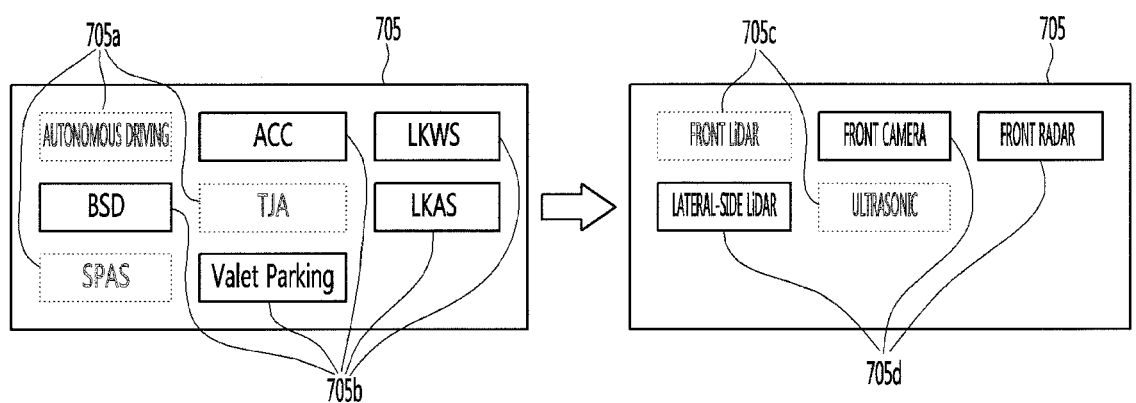
FIG. 10 illustrates a display when an autonomous driving function is selected, which is unable to be provided in FIG. 9, according to an embodiment of the present invention.

FIGS. 9 and 10 show embodiments that the external module 100 controls an internal display 705 of the vehicle 700. Regarding the description made with reference to the drawing, FIG. 9 shows a screen appeared as the external module 100 is connected to the vehicle 700 including a camera 761 and the distance sensor 762.

The external module 100 controls the internal display 705 of the vehicle 700 to display a function 705*b*, which can be provided, and a function 705*a*, which is unable to be provided, among various ADAS functions while distinguishing between the function 705*b* and the function 705*a*.

The server 300 determines whether a specific ADAS function can be provided by using the camera 761 and the distance sensor 762.

The external module 100 controls the internal display 705 of the vehicle 700 to strongly display Adaptive Cruise Control (ACC), Lane Keeping Warning System (LKWS), Traffic Sign Recognition (TSR), Lane Keeping Assist System (LKAS), and Forward Collision Warning (FCW) functions, which are able to be provided by using the camera 761 and the distance sensor 762, in a solid line.

In addition, the external module 100 controls the internal display 705 of the vehicle 700 to blurredly display, in a dotted line, autonomous driving, Traffic Jam Assist (TJA), and Autonomous Emergency Braking (AEB) functions which are unable to be provided by using the camera 761 and the distance sensor 762.

FIG. 10 shows the display 705 when a user selects an autonomous driving function that is a function 705*a*, which is unable to be provided by the external module 100 in FIG. 9.

The external module 100 controls the internal display of the vehicle 700 to display the right side of an arrow mark when the user selects the autonomous driving function from the display 705 positioned at the left side of the arrow mark.

The screen positioned at the right side of the arrow mark shows sensors necessary to provide the autonomous driving function. The screen positioned at the right side separately shows sensors 705*d*, which are previously provided, and sensors 705*c* additionally necessary. A front camera, and front Radar and lateral-side LiDAR, which serve as the previously-provided sensors 705*d*, are strongly displayed in a solid line, and the front LiDAR and the distance sensor, which serve as the sensors 705*c* additionally necessary, are blurredly displayed in a dotted line.

Figure 11:
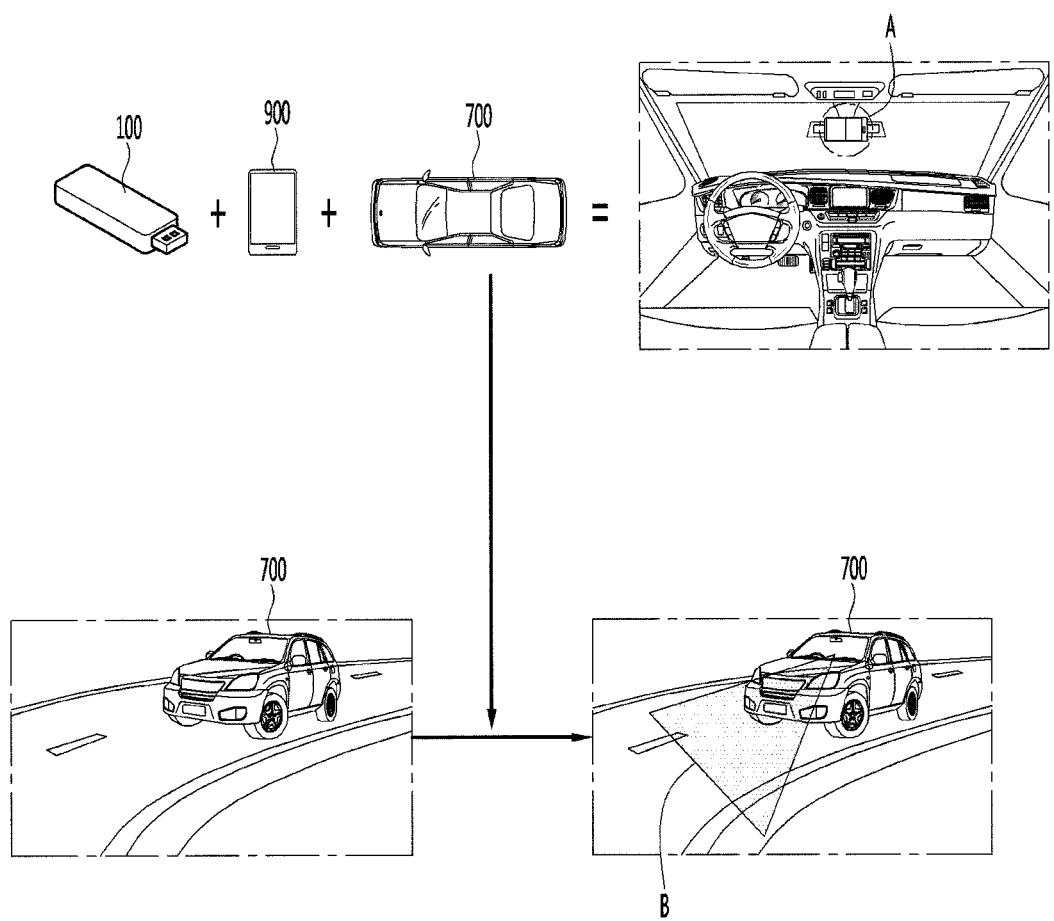
FIG. 11 illustrates an embodiment of providing an ADAS function with a sensor that is additionally provided on a vehicle.

Although the displays 705 of FIGS. 9 and 10 are shown in the form of the internal display 705 of the vehicle 700, the displays 705 of FIGS. 9 and 10 may be applied even to the display of the external module 100 or the display of the terminal 200. In addition, the vehicle 700 may have various sensors and the configurations of screens to be displayed and the manner for displaying the screens may be varied. For example, whether a certain function can be provided or not may be displayed in color or in various shapes instead of displaying the solid line or dotting line. FIG. 11 shows the embodiment of providing an ADAS function by additionally providing a sensor to the vehicle 700. The details thereof will be described with reference to accompanying drawings. The vehicle 700 shown in FIG. 11 is a vehicle 700 having no camera, and may not provide LKAS and TSR functions.

In this instance, when a camera installed to face the front portion or a camera of a mobile 900 is attached or coupled to a proper position inside the vehicle 700, the LKAS and TSR functions may be provided to the vehicle 700. An example of using the mobile 900 will be described with reference to FIG. 11.

The external module 100 may make a display such that the sensor of the mobile 900 is recommended to the user to serve as a sensor additionally necessary to provide the LKAS and TSR functions to the vehicle 700.

In addition, the external module 100 may inform or guide a position A suitable for mounting or attaching the mobile 900. The display or guide may be made on the internal display of the vehicle 700, the display of the external module 100, or the display of the terminal.

If the mobile 900 is mounted at the proper position, the camera of the mobile 900 senses a front portion B of the vehicle 900, and transmits information sensed from the camera of the mobile 900 to the external module 100. In addition, the external module 100 is updated based on the surrounding information of the vehicle 700 and the state information of the vehicle 700 in addition to the information sensed by the camera of the mobile 900 to acquire LKAS and TSR information based on this. The external module 100 may transmit control information for the execution of LKAS and TSR functions to the vehicle 700 and the vehicle 700 may execute the LKAS function and the TSR function, so that the ADAS function, which is unable to be provided, may be provided.

Figure 12:
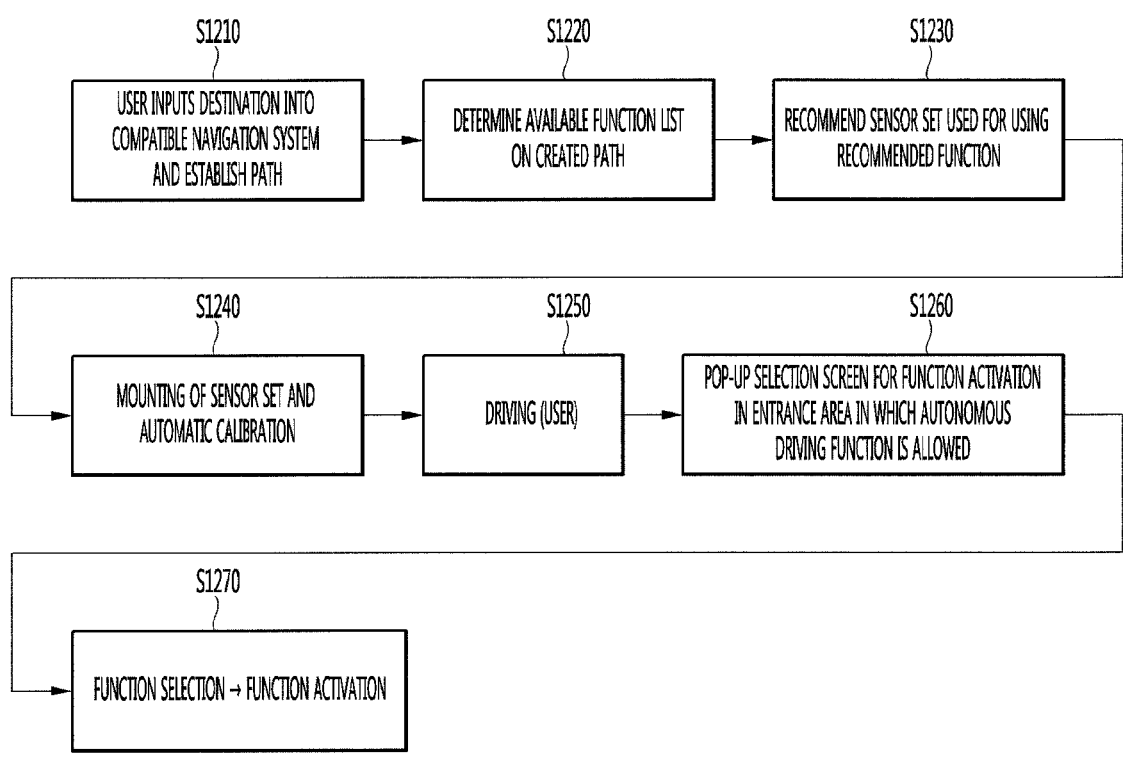
FIG. 12 illustrates a flowchart for providing an ADAS function by using the external module in the state that information on a traveling path of a vehicle or a destination of the vehicle is input according to an embodiment of the present invention.
Figure 13:
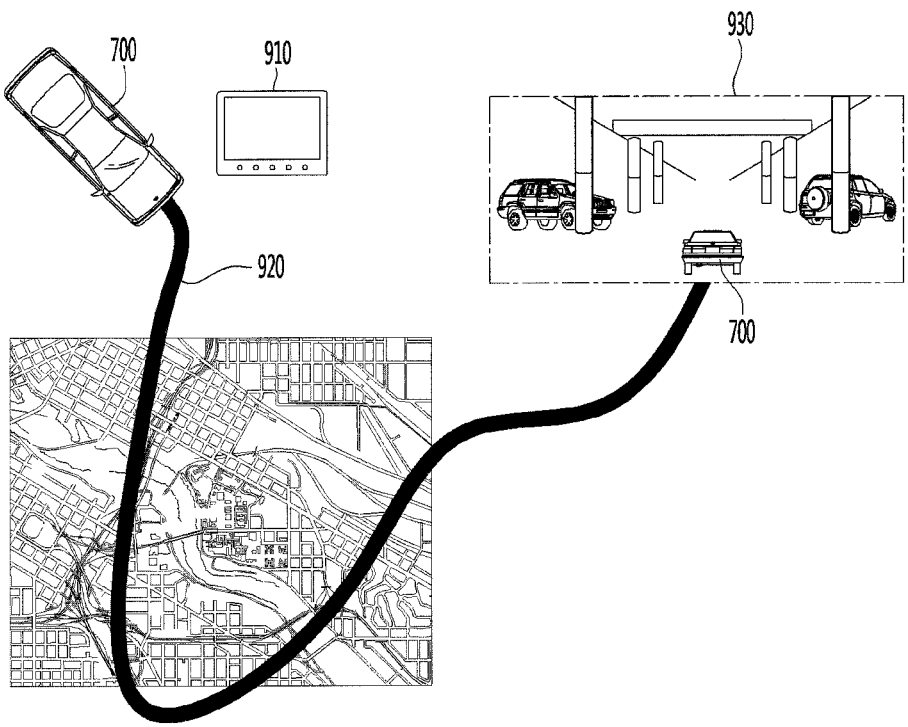
FIG. 13 illustrates an embodiment of providing an ADAS function depending on the traveling path of the vehicle.

FIGS. 12 and 13 show embodiments that the ADAS function is provided by using an external module under the situation that information on the traveling path or the destination of the vehicle is input.

Hereinafter, the description will be made with reference to FIG. 12 step by step. The step (S1210) allowing a user to input a destination or a traveling path through a navigation system is executed. If the traveling path of the vehicle is generated, a recommended ADAS function, which can be used on the traveling path, is searched (S1220).

In this instance, the procedure of searching for the recommended ADAS function is performed through an external module 100. In addition, if the sensor for employing the recommended ADAS function is lack, a sensor to be provided is recommended (S1230).

If the necessary sensor is added, the added sensor is linked to the external module 100 to perform calibration (S1240). If the vehicle arrives at an area in which the recommended ADAS function can be used during driving (S1250), an activation selecting screen for using the ADAS function is popped up (S1260).

The pop-up is performed on the internal display of the vehicle 700, the display unit 160 of the external module 100, or the display of the terminal 200. If the user selects the ADAS function, the ADAS function is activated (S1270).

FIG. 13 shows the detailed embodiment. Referring to the drawing, the vehicle 700 receives an input of a traveling path 920 through a navigation system 910, searches for that there is a parking lot on the traveling path 920, and checks a parking assist system (PAS) serving as the recommended ADAS function which can be provided.

In this instance, the external module recommends a sensor for providing the PAS function if the PAS function is unable to be provided to the vehicle 700.

If the PAS function can be provided to the vehicle 700, and if a user arrives at a parking lot 930 while driving the vehicle 700, an activation select screen for providing the PAS function is popped up and a user selects this. Accordingly, the PAS function is provided to the vehicle.

Figure 14:
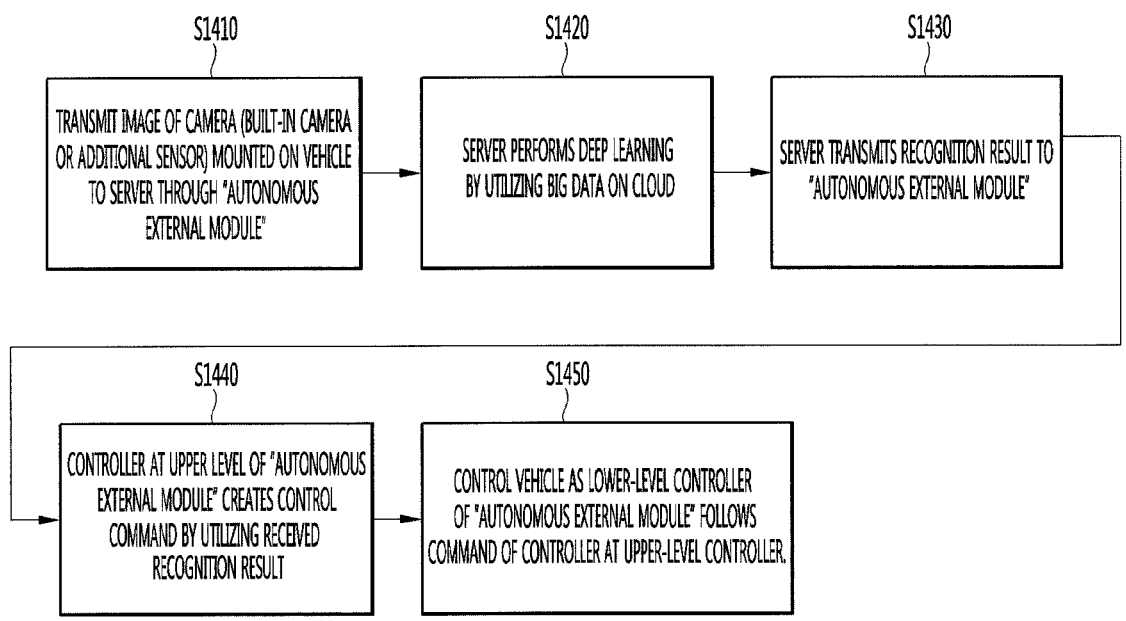
FIG. 14 is a flowchart of performing autonomous driving by using the external module and the server according to an embodiment of the present invention.

FIGS. 14 and 15 show embodiments of performing an autonomous driving function by using the external module and the server.

Hereinafter, the description will be made with reference to FIG. 14 step by step. If the image of a camera mounted on a vehicle is transmitted to a server through an external module (S1410), the server performs deep learning by utilizing big data of a cloud (S1420). In this instance, data constituting big data may include data sensed by another vehicle positioned around a vehicle, in addition to data transmitted through the external module 100.

The server 300 analyzes data received through various routes, acquires information for the autonomous function, and transmits the information to the external module 100 (S1430).

The external module 100 receives information for autonomous driving from a server 300 and generates a control command while serving as a controller positioned at an upper level (S1440).

The external module 100 transmits the control command to the vehicle 700, the internal controller of the vehicle 700 performs the autonomous driving by following the control command while serving as a controller at a lower level than the external module 100 (S1450).

FIG. 15 shows the detailed embodiment. In the following description made with reference to accompanying drawings, (a) of FIG. 15 shows a vehicle 940, which is positioned around the vehicle 700, sensed only by a sensor provided in the vehicle 700. The external module 100 transmits information on the vehicle 940 positioned around the vehicle 700 to the server 300, and the server 300 collects surrounding information sensed by the surrounding vehicle 940 as well as the vehicle 700.

The server 300 may directly transmit, to the vehicle 700, information sensed by a vehicle 940 around the vehicle 700, and acquires the ADAS information to be transmitted to the vehicle 700 such that the vehicle 700 may use the ADAS function. If the vehicle 700 directly receives, from the server information sensed by the vehicle 940 which is sensed around the vehicle 700, the external module 100 may process the sensed information and may acquire the ADAS information.

The vehicle receiving the ADAS information may sense vehicles 950 which are positioned around the vehicle 700 throughout a wider range, as illustrated in (b) of FIG. 15.

FIGS. 16 to 23 show embodiments of providing ADAS information through the combination of the external module and the terminal or the external module and the server. The description overlapped with the technical content that is described with reference to FIGS. 6 to 7 will be omitted from the following description.

Figure 16:
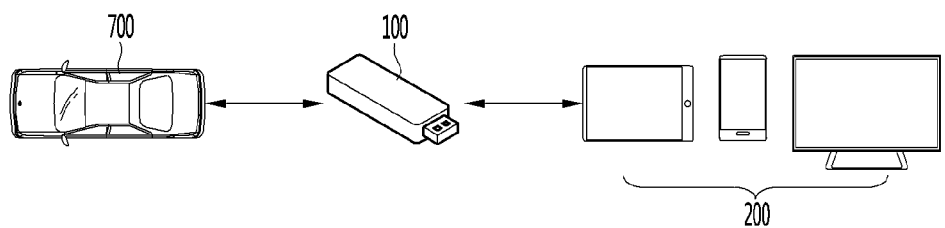
FIG. 16 illustrates a system, in which the external module performs communication with the terminal according to an embodiment of the present invention.

FIG. 16 shows a system that the external module 100 performs communication with the terminal 200 according to an embodiment of the present invention. Referring to the drawing, the vehicle 700, the external module 100, and the terminal 200 constitute a system. The vehicle 700, which is connected to the external module 100, has no communication function. The external module 100 is physically connected to the vehicle 700 to exchange data with the vehicle 700. The expression of "being physically connected" refers to that the external module 100 and the vehicle 700 are not connected to each other in wireless. The external module 100 and the terminal 200 are connected to each other through the short-range communication.

The external module 100 transmits the surrounding information of the vehicle 700 and the state information of the vehicle 700, which are received through the interface 130, to the terminal 200. The terminal 200 is configured with a computation function to acquire the ADAS information based on the surrounding information of the vehicle 700 and the state information of the vehicle 700 and to transmit the acquired ADAS information to the external module 100.

Figure 17:
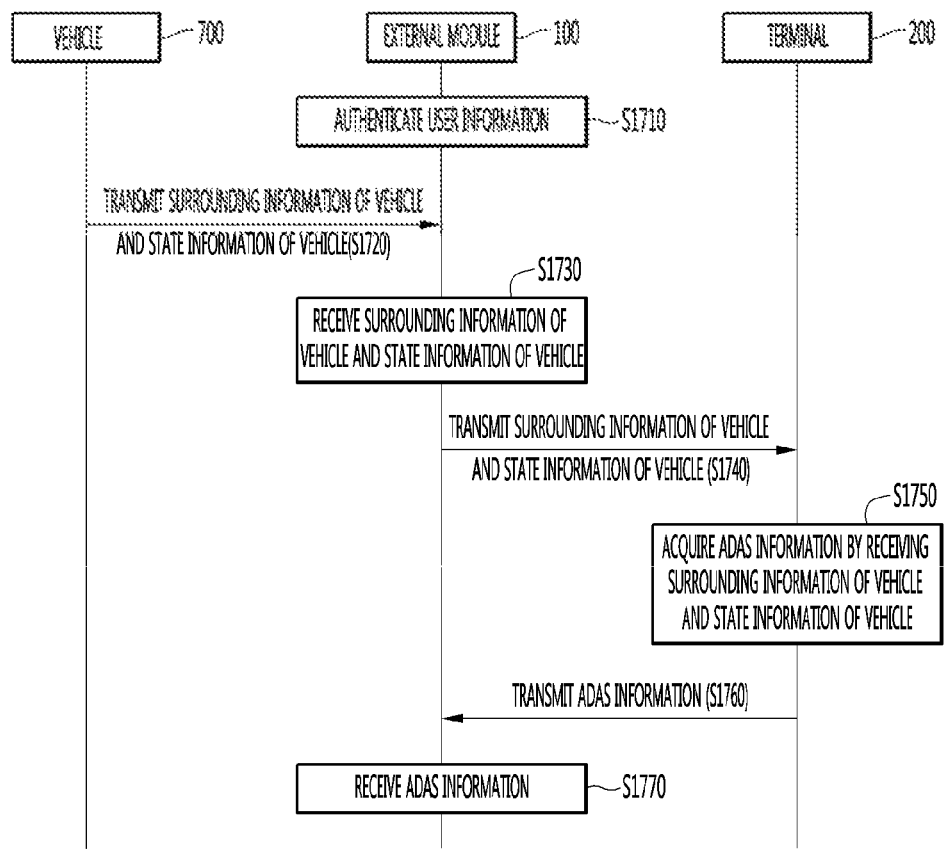
FIG. 17 illustrates a flowchart for when the external module provides an ADAS function to a vehicle in a system shown in FIG. 16 according to an embodiment of the present invention.

FIG. 17 is a flowchart of providing, by the external module 100, the ADAS function to the vehicle 700 in the system shown in FIG. 16. The flowchart will be described step by step below.

If the external module 100 is physically connected to the vehicle 700, the external module 100 authenticates user information (S1710). If the user information is matched with the user information, which is previously stored in the external module 100, the user information is authenticated, the vehicle 700 sends the surrounding information of the vehicle 700 and the state information of the vehicle 700 to the external module 100 (S1720). The external module 100 receives the surrounding information of the vehicle 700 and the state information of the vehicle 700 from the vehicle 700 (S1730) and transmits the surrounding information of the vehicle 700 and the state information of the vehicle 700, which are received, to the terminal 200 (S1740). The terminal 200 receives the surrounding information of the vehicle 700 and the state information of the vehicle 700 from the external module 100 and acquires the ADAS information based on the surrounding information of the vehicle 700 and the state information of the vehicle 700 (S1750). The terminal 200 transmits the acquired ADAS information to the external module 100 (S1760) and the external module 100 receives the ADAS information from the terminal 200 (S1770).

The description of technology content after the external module 100 receives the ADAS information is the same as the above description.

Figure 18:
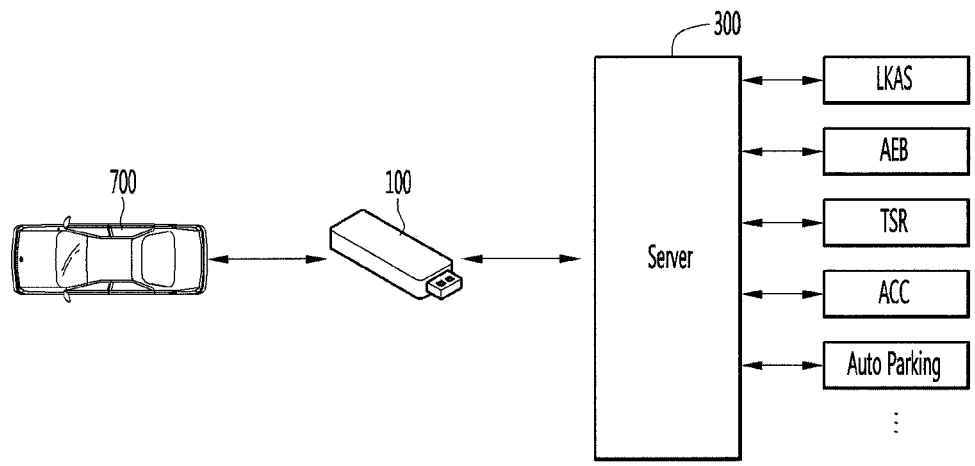
FIG. 18 illustrates a system in which an external module performs communication with a server according to an embodiment of the present invention.

FIG. 18 illustrates a system that the external module 100 performs communication with the server 300 according to an embodiment of the present invention. Referring to the drawing, the vehicle 700, the external module 100, and the server 300 constitute the system. The vehicle 700, which is connected to the external module 100, has no communication function. The external module 100 is physically connected to the vehicle 700 to exchange data. The expression of "being physically connected" refers to that the external module 100 and the vehicle 700 are not connected to each other in wireless. The external module 100 and the server 200 are connected to each other through telecommunication.

The external module 100 transmits, to the server 300, the surrounding information of the vehicle 700 and the state information of the vehicle 700 received through the interface 130. The server 300 is configured with a computation function to acquire the ADAS information based on the surrounding information of the vehicle 700 and the state information of the vehicle 700 and to transmit the acquired ADAS information to the external module 100.

Figure 19:
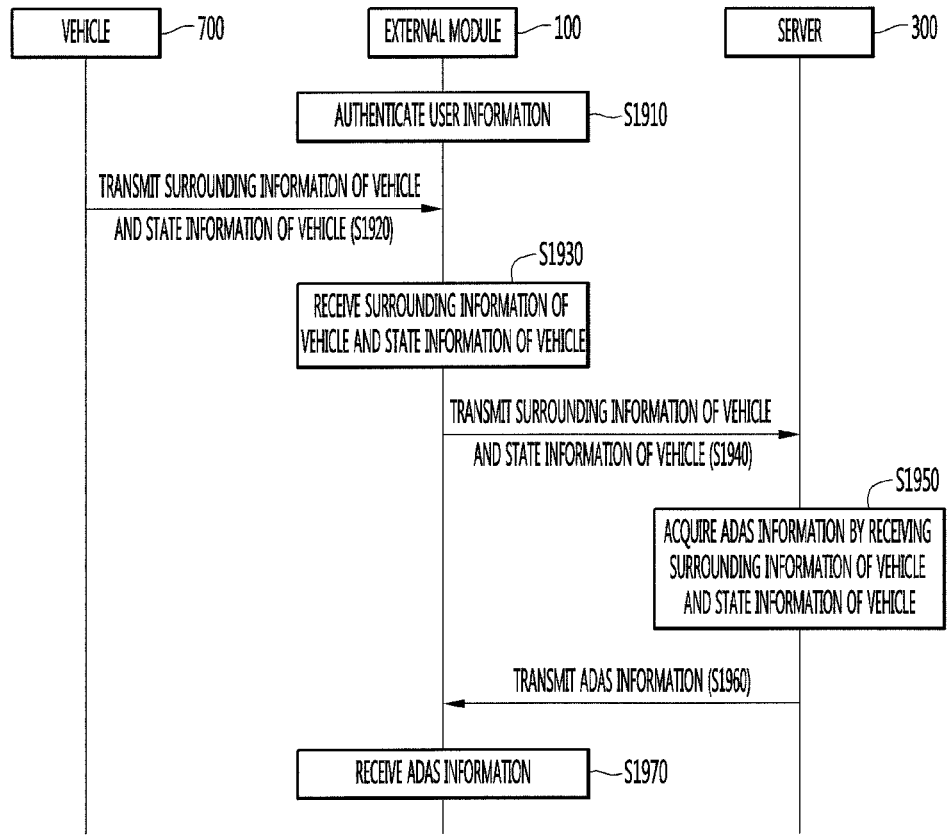
FIG. 19 is a flowchart for an external module providing an ADAS function to a vehicle in a system shown in FIG. 18 according to an embodiment of the present invention.

FIG. 19 is a flowchart of providing, by the external module 100, the ADAS function to the vehicle 700 in the system shown in FIG. 18. The flowchart will be described step by step below.

If the external module 100 is physically connected to the vehicle 700, the external module 100 authenticates user information (S1910). If the user information is matched with the user information, which is previously stored in the external module 100, the user information is authenticated, the vehicle 700 send the surrounding information of the vehicle 700 and the state information of the vehicle 700 to the external module 100 (S1920). The external module 100 receives the surrounding information of the vehicle 700 and the state information of the vehicle 700 from the vehicle 700 (S1930) and transmits the surrounding information of the vehicle 700 and the state information of the vehicle 700, which are received, to the server 300 (S1940). The server 300 receives the surrounding information of the vehicle 700 and the state information of the vehicle 700 from the external module 100 and acquires the ADAS information based on the surrounding information of the vehicle 700 and the state information of the vehicle 700 (S1950). The server 300 transmits the acquired ADAS information to the external module 100 (S1960), and the external module 100 receives the ADAS information from the server 300 (S1970).

The description of the technology content after the external module 100 receives the ADAS information is the same as the above description.

Figure 20:
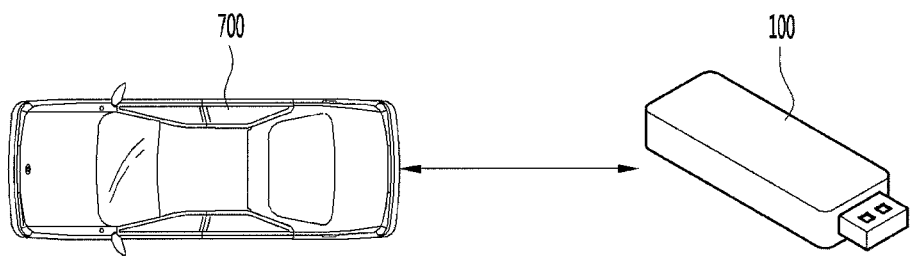
FIG. 20 illustrates a system in which an external module computes ADAS information according to an embodiment of the present invention.

FIG. 20 is a view illustrating a system that the external module 100 computes the ADAS information according to an embodiment of the present invention. Referring to the drawing, the vehicle 700 and the external module 100 constitute the system. The vehicle 700, which is connected to the external module 100, has no communication function. The external module 100 is physically connected to the vehicle 700 to exchange data. The expression of "being physically connected" refers to that the external module 100 and the vehicle 700 are not connected to each other in wireless.

The external module 100 receives the surrounding information of the vehicle 700 and the state information of the vehicle 700 through the interface 130. The external module 100 is configured with a computation function to acquire the ADAS information based on the surrounding information of the vehicle 700 and the state information of the vehicle 700.

Figure 21:
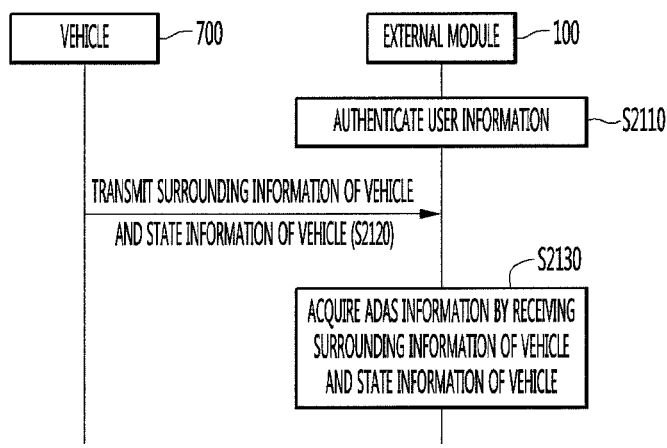
FIG. 21 illustrate a flowchart for an external module providing an ADAS function to a vehicle in a system shown in FIG. 20 according to an embodiment of the present invention.

FIG. 21 is a flowchart of providing, by the external module 100, the ADAS function to the vehicle 700 in the system shown in FIG. 20. The flowchart will be described step by step below.

If the external module 100 is physically connected to the vehicle 700, the external module 100 authenticates user information (S2110). If the user information is matched with the user information, which is previously stored in the external module 100, the user information is authenticated, and the vehicle 700 transmits the surrounding information of the vehicle 700 and the state information of the vehicle 700 to the external module 100 (S2120). The external module 100 receives the surrounding information of the vehicle 700 and the state information of the vehicle 700 from the vehicle 700 and acquires the ADAS information based on the surrounding information of the vehicle 700 and the state information of the vehicle 700 (S2130).

The description of the technology content after the external module 100 receives the ADAS information is the same as the above description.

Figure 22:
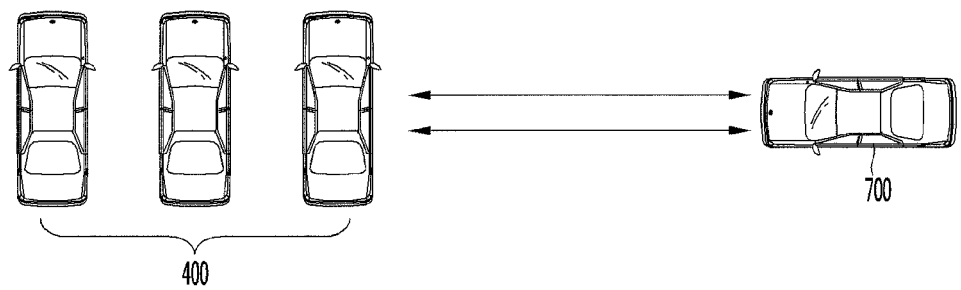
FIG. 22 shows a system that an external module makes communication with another vehicle according to an embodiment of the present invention.

FIG. 22 shows that the external module 100 performs communication with another vehicle 400 according to an embodiment of the present invention. Referring to the drawing, the vehicle 700, the external module 100, and the another vehicle 400 constitute the system. The vehicle 700, which is connected to the external module 100, has no communication function. The external module 100 is physically connected to the vehicle 700 to exchange data. The expression of "being physically connected" refers to that the external module 100 and the vehicle 700 are not connected to each other in wireless. The external module 100 and another vehicle 400 are connected to each other through near field and far field communication.

The external module 100 transmits, to the another vehicle 400, the surrounding information of the vehicle 700 and the state information of the vehicle 700 through the interface. The another vehicle 100 is configured with a computation function to acquire the ADAS information based on the surrounding information of the vehicle 700 and the state information of the vehicle 700 and to transmit the acquired ADAS information to the external module 100.

Figure 23:
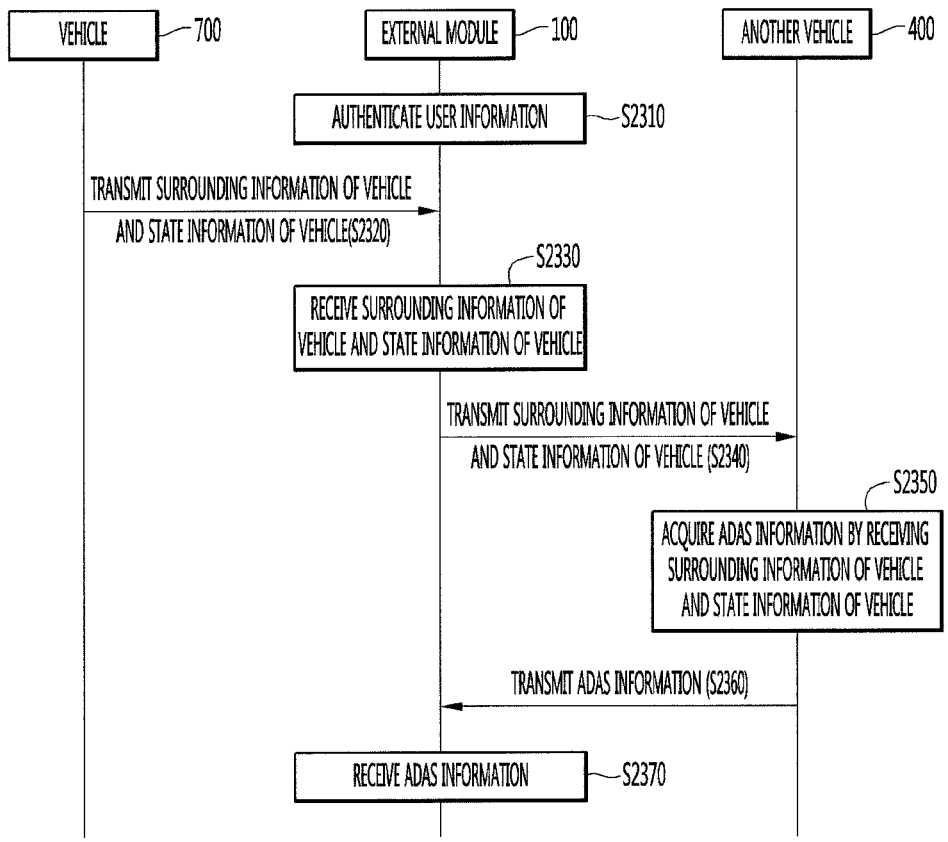
FIG. 23 is a flowchart that an external module provides an ADAS function to a vehicle in the system shown in FIG. 22.

FIG. 23 is a flowchart that the external module 100 provides the ADAS function to the vehicle 700 in the system shown in FIG. 22. The flowchart will be described step by step below.

If the external module 100 is physically connected to the vehicle 700, the external module 100 authenticates user information (S2310). If the user information is matched with the user information, which is previously stored in the external module 100, the user information is authenticated, and the vehicle 700 transmits the surrounding information of the vehicle 700 and the state information of the vehicle 700 to the external module 100 (S2320). The external module 100 receives the surrounding information of the vehicle 700 and the state information of the vehicle 700 from the vehicle 700 (S2330) and transmits the surrounding information of the vehicle 700 and the state information of the vehicle 700 to the another vehicle 400 (S2340). The another vehicle 400 receives the surrounding information of the vehicle 700 and the state information of the vehicle 700 from the external module 100 and acquires the ADAS information based on the surrounding information of the vehicle 700 and the state information of the vehicle 700 (S2350). The another vehicle 400 transmits the acquired ADAS information to the external module 100 (S2360) and the external module 100 receives the ADAS information from the another vehicle 400 (S2370).

The description of the technology content after the external module 100 receives the ADAS information is the same as the above description.

Figure 24:
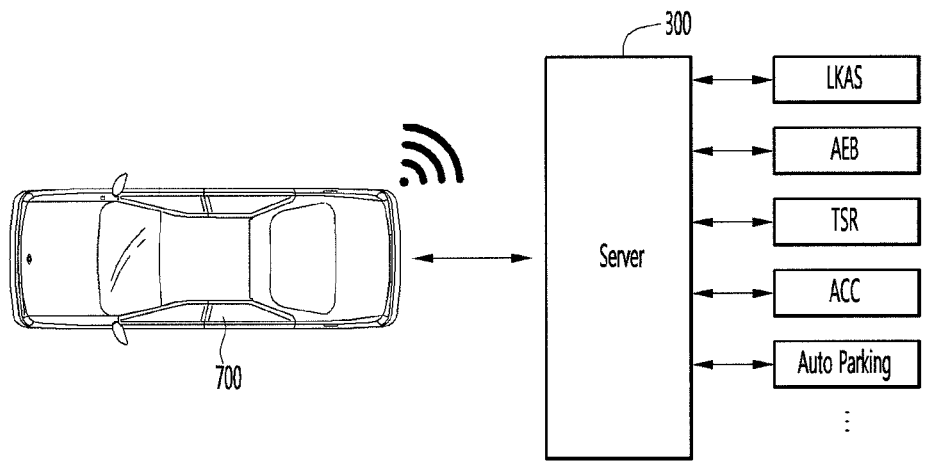
FIG. 24 is a system that a vehicle makes communication with a server.

FIG. 24 shows that the vehicle 700 performs communication with the server 300. Referring to the drawing, the vehicle 700 and the server 300 constitute the system. The vehicle 700 is equipped with a communication function to directly make communication with the server 300.

The vehicle 700 transmits the surrounding information of the vehicle 700 and the state information of the vehicle 700 to the server 300. The server 300 acquires the ADAS information based on the surrounding information of the vehicle 700 and the state information of the vehicle 700 and transmits the acquired ADAS information to the vehicle 700.

Although the embodiment shown in FIG. 24 is a system which does not include the external module, when a vehicle equipped with the communication function is connected to the external module, the ADAS information may be acquired together with the embodiment described above.

In more detail, among the ADAS information acquired from the server, the terminal, or the another vehicle through the external module and the ADAS information acquired as the vehicle directly performs communication with the server, ADAS information having higher reliability is selected and utilized. Accordingly, the ADAS function may be executed in a mutually complementarily manner.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are merely examples and do not limit the present invention. Thus, those skilled in the art to which the present invention pertains will know that various modifications and applications which have not been exemplified may be performed within a range which does not deviate from the characteristics of the embodiments. For instance, the constituent elements described in detail in the example embodiments can be modified. Further, the differences related to such modifications and applications shall be construed to be included in the scope of the present invention specified in the attached claims.

INDUSTRIAL APPLICABILITY

A vehicle in which the ADAS function is not natively mounted or the vehicle in which the ADAS function is lacking may not receive the full benefits of the new ADAS technology. In addition, even if the ADAS function is mounted, the vehicle having no native communication function may not receive an advanced ADAS function.

However, according to an embodiment of the present invention, as the vehicle having no native communication function is connected to the external module, the vehicle can now be provided with a communication function. Accordingly, the present invention has an industrial applicability.

In addition, the vehicle connected to the external module can transmit the surrounding information of the vehicle and the state information of the vehicle to the outside, can be informed with an available ADAS function, and can execute the ADAS function. Accordingly, the present invention has an industrial applicability.

The invention claimed is:

1. An external module comprising:
an interface configured to connect to a vehicle for exchanging data with the vehicle; and
a processor configured to:
receive, via the interface, surrounding information of the vehicle and state information,
acquire advanced driver assistance system (ADAS) information based on the surrounding information of the vehicle and the state information of the vehicle, and
transmit to the vehicle, via the interface, the ADAS information for an internal display of the vehicle to display the ADAS information,
wherein the external module is a portable device,
wherein the ADAS information includes information on whether at least one ADAS function is available determined based on at least one of the surrounding information or the state information, and
wherein the processor is further configured to:
transmit, via the interface, a control signal to the vehicle for indicating on the internal display of the vehicle that a certain ADAS function is currently unable to be provided to the vehicle,
control the internal display of the vehicle to display information indicating a lane keeping assist system (LKAS) function is currently unable to be provided to the vehicle, and
in response to receiving an input for selecting the LKAS function, control the internal display of the vehicle to display information on a camera for providing the LKAS function to the vehicle and information on installation of the camera.

2. The external module of claim 1, wherein the portable device is a thumb drive or a dongle, and
wherein the portable device is configured to be connected to the vehicle by insertion.

3. The external module of claim 1, wherein the interface is a universal serial bus (USB) connector.

4. The external module of claim 1, further comprising:
a communication unit configured to wirelessly exchange data with a terminal,
wherein the processor is further configured to:
transmit, via the communication unit, the surrounding information of the vehicle and the state information of the vehicle to the terminal; and
receive, from the terminal, the ADAS information based on the surrounding information of the vehicle and the state information of the vehicle.

5. The external module of claim 1, further comprising:
an input unit configured to receive user information,
wherein the processor is further configured to:
in response to the interface being connected to the vehicle, perform authentication by comparing the user information received through the input unit with authentication information stored in a memory, and
in response to the user information being matched with the authentication information, receive, via the interface, the surrounding information of the vehicle and the state information of the vehicle through the interface.

6. The external module of claim 1, wherein the processor is further configured to:
transmit, via the interface, a control signal to the vehicle for displaying an ADAS function by the internal display of the vehicle.

7. The external module of claim 6, wherein the processor is further configured to:
receive, via the interface, a selection of a specific ADAS function among ADAS functions provided to the vehicle, and
transmit, to the vehicle, a control signal for executing the specific ADAS function.

8. The external module of claim 1, wherein the processor is further configured to:
control the internal display of the vehicle to display information indicating that an additional sensor is necessary to provide the certain ADAS function that is currently unable to be provided to the vehicle and information for installation of the additional sensor.

9. The external module of claim 8, wherein the processor is further configured to:
in response to receiving sensor information from the additional sensor, control the internal display of the vehicle to indicate that the certain ADAS function is transitioned from an unavailable state to an available state.

10. The external module of claim 1, wherein the processor is further configured to:
in response to receiving image information from a camera additionally installed in the vehicle based on the information on installation of the camera, control the internal display of the vehicle to indicate that the LKAS function is transitioned from an unavailable state to an available state.

11. The external module of claim 1, wherein the processor is further configured to:

in response to receiving information from a sensor added to the vehicle, acquire ADAS information based on the surrounding information of the vehicle, the state information of the vehicle and the information received from the sensor.

12. The external module of claim 1, further comprising:
a communication unit configured to wirelessly exchange data with a server,
wherein the processor is further configured to:
acquire, via the communication unit, information on a specific traveling path and additional ADAS information for traveling along the specific traveling path from the server, and
transmit, via the interface, a control signal to the vehicle for commanding the internal display of the vehicle to display the additional ADAS information provided by the server.

13. The external module of claim 1, further comprising:
a communication unit configured to wirelessly exchange data with another vehicle,
wherein the processor is further configured to:
transmit, via the communication unit, the surrounding information of the vehicle and the state information of the vehicle to the another vehicle, and
receive, from the another vehicle, additional ADAS information based on the surrounding information of the vehicle and the state information of the vehicle.

14. The external module of claim 1, wherein the processor is further configured to:
directly compute the ADAS information based on the surrounding information of the vehicle and the state information of the vehicle.

15. A vehicle comprising:
a sensor configured to acquire vehicle surrounding information;
a display;
an interface configured to connect to an external module for exchanging data with the external module; and
a processor configured to:
transmit, via the interface, the vehicle surrounding information to the external module,
receive, via the interface, advanced driver assistance system (ADAS) information based on the vehicle surrounding information from the external module, and
control the display to display the ADAS information received from the external module,
wherein the ADAS information includes information on whether at least one ADAS function is available determined based on the vehicle surrounding information, and
wherein the processor is further configured to:
transmit, via the interface, a control signal to the vehicle for indicating on the internal display of the vehicle that a certain ADAS function is currently unable to be provided to the vehicle,
control the internal display of the vehicle to display information indicating a lane keeping assist system (LKAS) function is currently unable to be provided to the vehicle, and
in response to receiving an input for selecting the LKAS function, control the internal display of the vehicle to display information on a camera for providing the LKAS function to the vehicle and information on installation of the camera.

16. The vehicle of claim 15, further comprising:
an input unit configured to receive user information,
wherein the processor is further configured to:
in response to the external module being connected to the interface, perform authentication by comparing the user information received through the input unit with authentication information stored in a memory, and
in response to the user information being matched with the authentication information, transmit, via the interface, the vehicle surrounding information.

17. The vehicle of claim 15, wherein the portable device is a thumb drive or a dongle, and
wherein the interface is configured to be connected to the portable device by insertion.

\* \* \* \* \*